United States Patent
Sawada et al.

(10) Patent No.: US 8,494,260 B2
(45) Date of Patent: Jul. 23, 2013

(54) IMAGE PROCESSING DEVICE, IMAGE PROCESSING METHOD, PROGRAM, AND IMAGING DEVICE

(75) Inventors: Yasuhiro Sawada, Eindhoven (NL); XianJi Zhang, Tokyo (JP); Takashi Masuda, Tokyo (JP)

(73) Assignee: Silicon Hive B.V., Eindhoven (NL)

(*) Notice: Subject to any disclaimer, the term of this patent is extended or adjusted under 35 U.S.C. 154(b) by 729 days.

(21) Appl. No.: 12/666,511

(22) PCT Filed: Jun. 24, 2008

(86) PCT No.: PCT/JP2008/061806
§ 371 (c)(1),
(2), (4) Date: Apr. 27, 2010

(87) PCT Pub. No.: WO2009/001956
PCT Pub. Date: Dec. 31, 2008

(65) Prior Publication Data
US 2010/0208106 A1    Aug. 19, 2010

(30) Foreign Application Priority Data

Jun. 25, 2007  (JP) ................................ 2007-166106
Jun. 25, 2007  (JP) ................................ 2007-166190
Dec. 26, 2007  (JP) ................................ 2007-335065

(51) Int. Cl.
G06K 9/00    (2006.01)
G06K 9/34    (2006.01)
H04N 9/68    (2006.01)

(52) U.S. Cl.
USPC ........................... 382/162; 382/173; 348/237

(58) Field of Classification Search
None
See application file for complete search history.

(56) References Cited

U.S. PATENT DOCUMENTS

| 6,919,892 B1* | 7/2005 | Cheiky et al. ................ 345/473 |
| 7,925,114 B2* | 4/2011 | Mai et al. ..................... 382/284 |
| 2007/0250197 A1* | 10/2007 | Glass et al. ..................... 700/96 |
| 2009/0027525 A1* | 1/2009 | Lin et al. ....................... 348/272 |

FOREIGN PATENT DOCUMENTS

| JP | 2001-186533 A | 7/2001 |
| JP | 2002-199410 A | 7/2002 |
| JP | 2004-241991 A | 8/2004 |
| JP | 2004-357298 A | 12/2004 |

OTHER PUBLICATIONS

International Search Report for PCT/JP2008/061806 (including translation) dated Oct. 7, 2008.

* cited by examiner

*Primary Examiner* — Shefali Goradia
(74) *Attorney, Agent, or Firm* — Leydig, Voit & Mayer, Ltd.

(57) ABSTRACT

An image processing device includes: a coordinate conversion unit (142) which calculates a corresponding sampling coordinate on a color mosaic image corresponding to a pixel position of a color image when a deformation process is performed, according to the pixel position of the color image; a sampling unit (143); a sampling unit (143) which interpolates-generates a pixel value in a sampling coordinate for each of color planes obtained by decomposing the color mosaic image; and a color generation unit (144) which generates a color image by synthesizing interpolation values of the respective color planes. Each pixel value of a color image subjected to a deformation process is obtained as a pixel value of the sampling coordinate from the color mosaic image by interpolation calculation, thereby realizing the color interpolation process for generating a color image from the color mosaic image and a deformation process of the color image by one interpolation calculation.

18 Claims, 21 Drawing Sheets

Figure 14

| focal point distance/ photographed subject distance | Wide: 28mm | Mid: 50mm | Tele: 105mm |
|---|---|---|---|
| Near: 0.5mm | 0.10 | 0.03 | -0.05 |
| Mid: 1.0m | 0.08 | 0.02 | -0.04 |
| far: Inf | 0.05 | 0.00 | -0.02 |

Figure 18
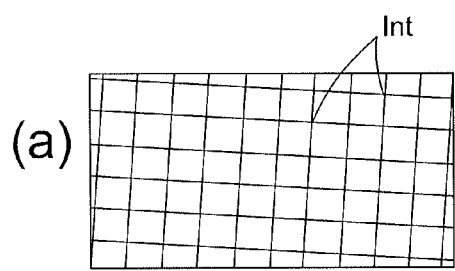
(a)
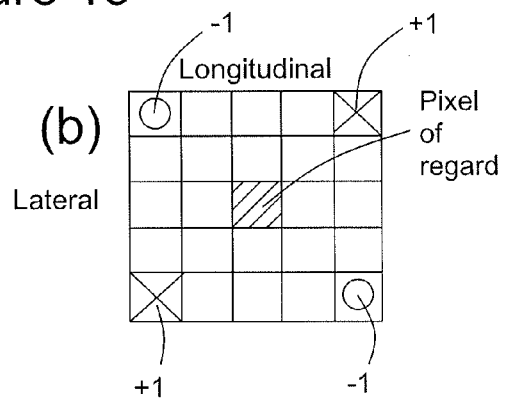
(b)
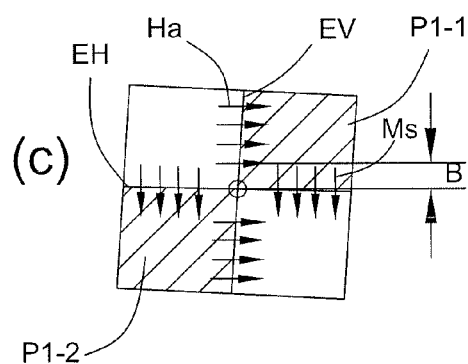
(c)
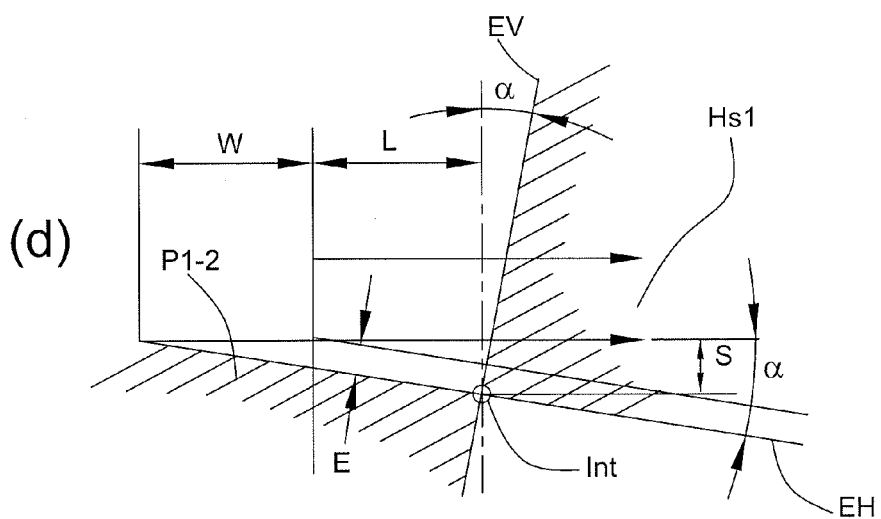
(d)

$$\begin{pmatrix} Y \\ U \\ V \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix}$$

$$\begin{pmatrix} x_d \\ y_d \end{pmatrix} = \begin{pmatrix} 0.001 & 0 & -0.7995 \\ 0 & 0.001 & -0.5995 \end{pmatrix} \begin{pmatrix} u_d \\ v_d \\ 1 \end{pmatrix}$$

Figure 24

$$\begin{pmatrix} x' \\ y' \end{pmatrix} = \begin{pmatrix} z \cdot \cos\theta & z \cdot \sin\theta & dx \\ -z \cdot \sin\theta & z \cdot \cos\theta & dy \end{pmatrix} \begin{pmatrix} x_d \\ y_d \\ 1 \end{pmatrix}$$

Figure 25

$$\begin{pmatrix} x_R \\ y_R \end{pmatrix} = \begin{pmatrix} k_R & 0 & d_{Rx} \\ 0 & k_R & d_{Ry} \end{pmatrix} \begin{pmatrix} x_G \\ y_G \\ 1 \end{pmatrix}$$

$$\begin{pmatrix} x_B \\ y_B \end{pmatrix} = \begin{pmatrix} k_B & 0 & d_{Bx} \\ 0 & k_B & d_{By} \end{pmatrix} \begin{pmatrix} x_G \\ y_G \\ 1 \end{pmatrix}$$

Figure 26

$$\begin{pmatrix} u_{SR} \\ v_{SR} \end{pmatrix} = \begin{pmatrix} 1000 & 0 & 799.5 \\ 0 & 1000 & 599.5 \end{pmatrix} \begin{pmatrix} x_R \\ y_R \\ 1 \end{pmatrix}$$

$$\begin{pmatrix} u_{SG} \\ v_{SG} \end{pmatrix} = \begin{pmatrix} 1000 & 0 & 799.5 \\ 0 & 1000 & 599.5 \end{pmatrix} \begin{pmatrix} x_G \\ y_G \\ 1 \end{pmatrix}$$

$$\begin{pmatrix} u_{SB} \\ v_{SB} \end{pmatrix} = \begin{pmatrix} 1000 & 0 & 799.5 \\ 0 & 1000 & 599.5 \end{pmatrix} \begin{pmatrix} x_B \\ y_B \\ 1 \end{pmatrix}$$

Figure 27

$$\begin{pmatrix} k_R & 0 & d_{Rx} \\ 0 & k_R & d_{Ry} \end{pmatrix} = \begin{pmatrix} x_{R1} & x_{R2} & \cdots \\ y_{R1} & y_{R2} & \cdots \end{pmatrix} \begin{pmatrix} x_{G1} & x_{G1} & \cdots \\ y_{G2} & y_{G2} & \cdots \\ 1 & 1 & \end{pmatrix}^{-1}$$

$$\begin{pmatrix} k_B & 0 & d_{Bx} \\ 0 & k_B & d_{By} \end{pmatrix} = \begin{pmatrix} x_{B1} & x_{B2} & \cdots \\ y_{B1} & y_{B2} & \cdots \end{pmatrix} \begin{pmatrix} x_{G1} & x_{G1} & \cdots \\ y_{G2} & y_{G2} & \cdots \\ 1 & 1 & \end{pmatrix}^{-1}$$

IMAGE PROCESSING DEVICE, IMAGE PROCESSING METHOD, PROGRAM, AND IMAGING DEVICE

FIELD OF INVENTION

The present invention relates to an image processing apparatus, image processing method, program and image-taking device, especially one with single-chip color imaging elements, that executes a demosaic process that generates a color image with interpolation of all pixel multiple color luminance of the color mosaic image from the single-chip color imaging elements.

BACKGROUND OF THE INVENTION

In recent years the popularity of digital cameras among consumers has been making assured progress. One of the reasons that can be cited for this is that the cost of digital cameras has continued to decrease and their price has reached levels within the reach of most consumers. In order to keep the cost down most digital cameras use what is called a single-chip image pickup device. In a single-chip digital camera only one imaging elements device is used to get the color information of each of the pixels within the color image.

With single-chip imaging elements each pixel image only contains the color information of a single color. However, the color image is expressed by combining 3 separate single-color images. In other words, in order to display the color image, the red, green and blue (RGB) values of each pixel is necessary. Because of this, in single-chip digital cameras, demosaic processing (also called color interpolation processing) of each of the pixels, using the color mosaic image, having one of the RGB constituents is performed (for example, see Patent References 1 and 2). The demosaic process is a process that generates a color image with each pixel having all the RGB constituents with the use of interpolation calculation on the lacking color luminance information gathered from the surrounding pixels of the corresponding color mosaic image pixels.

Also, as an example of correction processing, chromatic aberration correction is sometimes performed. The refraction index of lenses used for the imaging optics in digital camera differs in accordance with the wavelength of the image light. Because of this, the image magnification ratio for each of the RGB colors becomes different. Due to this, the size of the image formed on the imaging elements is different for each color. It is known, as can be seen in FIG. 20, that the image formed on the imaging elements can be misaligned for each color component. This is called the lens magnification chromatic aberration (horizontal distortion). If magnification chromatic aberration is present when photographing under a white light source, the area near both edges of the frame especially look like they become more iridescent and seem to lengthen in the radial ray direction. Also, along with the image misalignment, color shifting at the edges of the frame appears and there is a problem with damage to the quality of the image.

An imaging pickup device capable of suppressing this kind of color shifting is provided such that when there is a color shifting occurrence, in accordance with the image pickup obtained color image signal, the color aberration amount from the color image base position is detected and, in accordance with the detected amount of chromatic aberration, distortion correction is added to the color image signal.

There are also image pickup devices that detect the chromatic aberration amount by detecting the effective edge within the color image and the distance from the base position.

Furthermore, there are also proposals for digital cameras that output a synthesized RGB image signal that has been corrected for chromatic aberration. This is achieved by first taking the RGB signal output from the optical lens image pickup and correcting the chromatic aberration of each (G is base and magnification or reduction correction is done for RB) with the use of the optical lens specific focal point distance value (for example, refer to Patent Reference 3).

Patent Reference 1: Tokuhyo 2004-534429
Patent Reference 2: Tokukai 2000-270294
Patent Reference 3: Tokukai Hei 6-113309

SUMMARY OF THE INVENTION

However, with the traditional art, when generating a color image from a color mosaic image, in addition to the interpolation processing, afterwards a separate interpolation is required for distortion of the color image. In other words, pixel interpolation is being conducted twice. Because of this there is a problem that the processing load became greater. Also, for the image generated by the interpolation, as another interpolation is performed, there is a problem of image deterioration of the generated image becoming greater.

In addition, with the above traditional art, when detecting the chromatic aberration amount at the edge position with the color image, the proper RGB relation cannot be taken and sometimes the edge position cannot be detected.

In other words, in the color mosaic image having magnification chromatic aberration, as can be seen in FIG. 21, the luminance information values are different for the sampling position due to the RGB constituents, the edges of each color constituent do not match and high resolution cannot be obtained.

Because of this there is sometimes a problem in that the traditional edge position is not recognized as the edge and demosaicing that uses the edge position cannot be performed correctly.

Moreover, the digital camera cited in Patent Reference 3 is not a single-chip, it's a digital camera that uses the so called triple-chip. A triple-chip digital camera is equipped with a single imaging device for each of the RGB colors and uses a synthesis of the RGB output signals from the imaging elements to obtain the color image. In the triple-chip case, the number of the RGB pixels all match the number of pixels in the output image so, with a relatively simple image synthesis, a color image can be obtained. In short, in comparison to single-chip image sensor camera where the RGB pixel number is always less than the image output pixels, a triple-chip digital camera does not have the need of a demosaic process (color interpolation processing).

As opposed to this, in the case of a single-chip digital camera, in addition to the interpolation processing when the color image is generated from the color mosaic image, a separate interpolation process is required to correct the magnification chromatic aberration. In other words, pixel interpolation is being conducted twice. Because of this there is a problem that the processing load became greater. Also, for the image generated by the interpolation, as another interpolation is performed, there is a problem of image deterioration of the generated image becoming greater.

This invention is configured so as to resolve these kinds of problems and its purpose is to enable a lightening of the processing load and a lessening of the image deterioration when the distortion processed color image is generated from the color mosaic image.

In order to resolve these issues, this invention is equipped with a color plane decomposition unit that separates multiple color planes that include just the same chromatic pixel value as that of the color mosaic image, a coordinate conversion unit that calculates sampling coordinates of the corresponding color mosaic image from the pixel position of the color image, a sampling unit that interpolates the pixels within the sampling coordinates of the multiple of color planes and a color generation unit that generates a color image from the interpolation synthesis of each color plane.

The calculations for the sampling coordinates corresponding to the color mosaic image pixel position obtained after distortion processing of the color image is done in the coordinates conversion unit.

With the invention configured in this manner, as the prior step for the generation of the deformed color image from the color mosaic image, the sampling coordinates of the color mosaic image that correspond to the output deformed color image pixel position are calculated. Next, the deformed color image pixel value is generated using interpolation calculation of the color mosaic image pixel value in the aforementioned sampling coordinates. By doing so, from the color mosaic image, the sampling coordinates as pixel values can be sought from the color image that has been distortion processed.

In doing this, the color interpolation processing generating the color image from the color mosaic image and the aforementioned color image distortion processing can be realized at the same time with just one interpolation calculation. Due to this, in addition to being able to lessen the burden of the processing when generating the deformed color image from the color mosaic image the deterioration of image quality caused by the double interpolation required with the traditional method can be suppressed.

Also, in other embodiments of this invention, the invention is equipped with a color plane decomposition unit that separates multiple color planes that include just the same chromatic pixel value as that of the color mosaic image, a coordinate conversion unit that calculates sampling coordinates of the corresponding color mosaic image from the pixel position of the color image, a sampling unit that interpolates the pixels within the sampling coordinates of the multiple of color planes and a color generation unit that generates a color image from the interpolation synthesis of each color plane. In the coordinates conversion unit, for each of the plurality of color planes, using the different value coefficients from each of the color planes, the different sampling coordinate of each color plane is calculated from the color image pixel position.

With the invention configured in this manner, as the prior step for the generation of the deformed color image from the color mosaic image, the pixel position in each color plane adjusted for each color constituent misalignment due to magnification chromatic aberration is calculated using the sampling coordinates of the color mosaic image that correspond to the output deformed color image pixel position. Next, the deformed color image pixel value is generated using interpolation calculation of the color mosaic image pixel value in the aforementioned sampling coordinates. By doing so, from each of the magnification chromatic aberration corrected color image pixel position, the sampling coordinates as pixel values can be sought from the color mosaic image.

Also, in other embodiments of this invention, the coordinates conversion unit, in addition to the color aberration coefficient value that differs according to the color plane, uses at least one of the image distortion coefficient that expresses distortion of the color images, the imaging apparatus hand blur correction coefficient or the distortion aberration coefficient determined by the set focal point distance and distance to photographed object of the imaging optics that introduces the optical image to calculate the differing color plane sampling coordinate from the color image pixel position.

In doing this, the color interpolation processing (demosaic processing) generating the color image from the color mosaic image and the aforementioned imaging optics magnification chromatic aberration correction can be realized at the same time with just one interpolation calculation. Due to this, in addition to being able to lessen the burden of the processing when generating the deformed color image from the color mosaic image the deterioration of image quality caused by the double interpolation required with the traditional method can be suppressed.

With the invention configured in this manner, as the prior step for the generation of the deformed color image from the color mosaic image, in addition to that of the correction of color shifting due to magnification chromatic aberration, the image distortion, hand blur correction, lens state skew correction values of the corresponding color image pixel position on the color mosaic image are used for sampling coordinates calculation.

In doing this, the color interpolation processing generating the color image from the color mosaic image and the aforementioned imaging optics magnification chromatic aberration correction as well as hand blur correction, skew correction and other processes can be realized at the same time with just one interpolation calculation. Due to this, in addition to being able to lessen the burden of the processing when generating the deformed color image from the color mosaic image the deterioration of image quality caused by required multiple interpolations can be suppressed.

Also, other embodiments of this invention are equipped with an aberration coefficient unit that calculates the above noted chromatic aberration coefficient through the taking of a specified image and, using this aberration coefficient calculates each of the differing color plane sampling coordinates from the color image pixel position.

With the invention configured in this manner, as it is equipped with an aberration coefficient unit that calculates the color aberration coefficient for the specified image photographed, this calculated color aberration coefficient is used for realization of the color interpolation processing (demosaic processing), generating the color image from the color mosaic image and the aforementioned imaging optics magnification chromatic aberration correction all with just one interpolation calculation.

Also, in other embodiments of this invention, as it is equipped with an image output unit that is connected to an external device to receive that output and a coefficient input method for the aforementioned color aberration coefficient, using that input color aberration coefficient the color plane differing sample coordinates can be calculated from the color image pixel position.

With the invention configured in this manner, as it is equipped with an image output unit that is connected to an external device to receive that output and a coefficient input method for the aforementioned color aberration coefficient, using that color aberration coefficient, the color interpolation processing (demosaic processing), generating the color image from the color mosaic image and the aforementioned imaging optics magnification chromatic aberration correction all can be realized with just one interpolation calculation.

BRIEF DESCRIPTION OF THE DRAWINGS

FIG. 14 is an illustration showing an aberration coefficient table example of the $4^{th}$ embodiment.

FIG. 18 is a diagram that explains the chromatic aberration amount detection of the $5^{th}$ embodiment, with FIG. 18 (a)(b) explaining intersection detection and FIG. 18 (c) explaining edge detection at each intersection. FIG. 18 (d) shows the setting for the pixel rows.

FIG. 24 shows the formula used for blur correction.

FIG. 25 shows the formula used when converting the coordinates between color planes.

FIG. 26 shows the relational expression formula for the pixel coordinates of the color mosaic image for the XY coordinates of each color plane.

FIG. 27 shows the formula used for finding the chromatic aberration matrix.

DETAILED DESCRIPTION OF THE INVENTION ($1^{st}$ Embodiment)

The $1^{st}$ Embodiment of this present invention will be described in detail in accordance with the accompanying drawings.

Figure 1:
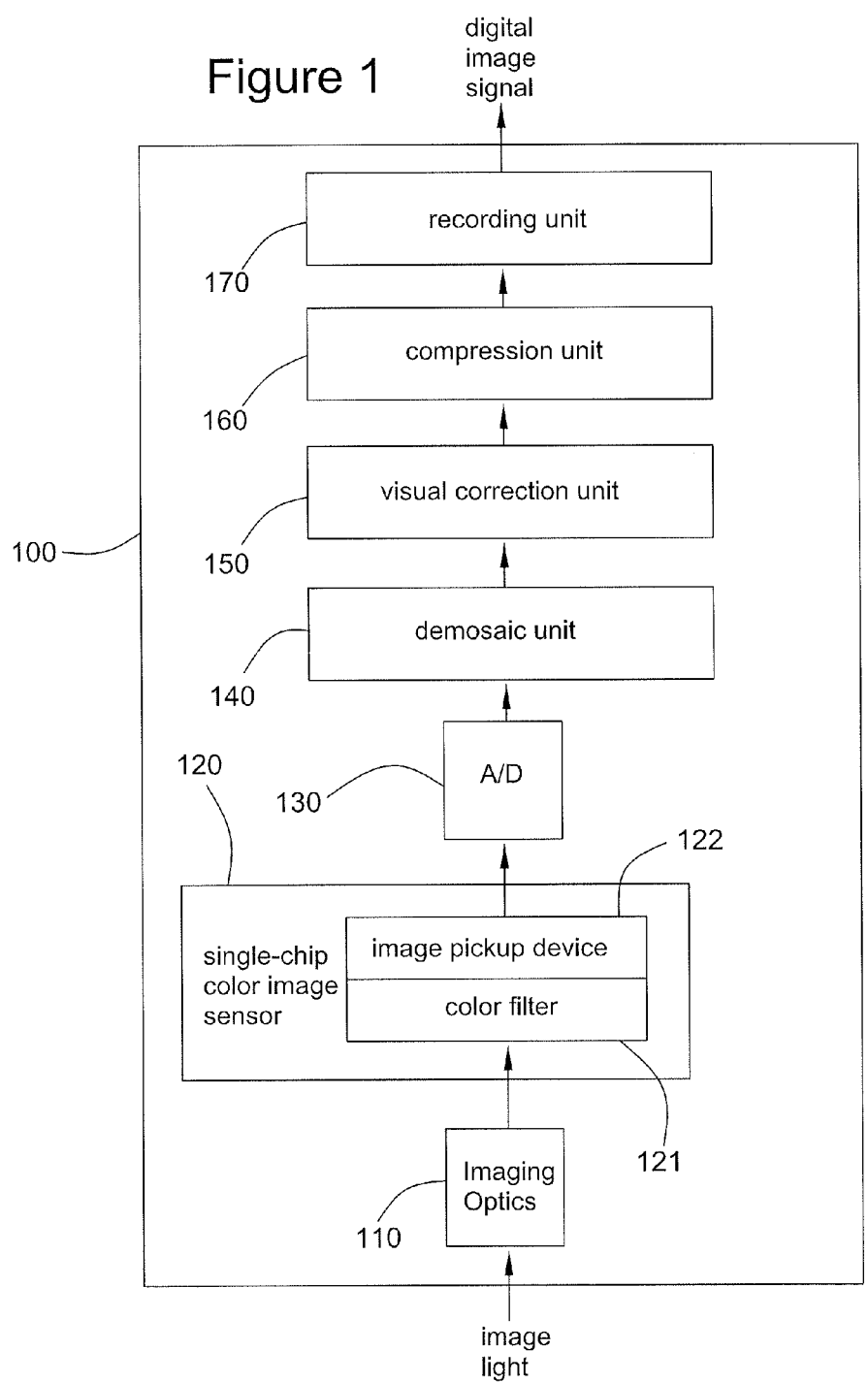
FIG. 1 is a diagram showing a schematic configuration of the color imaging apparatus of the $1^{st}$ embodiment of this invention's image processing device.

FIG. 1 is a diagram illustrating a schematic configuration of a color image apparatus (100) according to a $1^{st}$ embodiment of the present invention. The color image apparatus (100) of the embodiment is comprised of imaging optics (110), single-chip color image sensor (120), A/D conversion unit (130), demosaic unit (140), visual correction unit (150), compression unit (160) and a recording unit (170). Of these, the demosaic unit (140) corresponds to the image processing apparatus of the present invention.

The single-chip color image sensor (120) is equipped with imaging elements (122) which generates an image signal, the image signal having been passed through the imaging optics (110) and output to the color filter array (121) where it is split into the specified color constituents and, after passing through the color filter array (121) and undergoing photoelectric conversion. The imaging elements (122) are comprised of, for example, either a CCD (Charge Coupled Device) or CMOS (Complementary Metal Oxide Semiconductor) sensor.

The role of the imaging optics (110) is to introduce the optical image of an object onto the single-chip color image sensor (120). For example, the imaging optics (110) can be comprised including an optical low pass filter, a photographic lens and infrared removal filter and other such things. Moreover, the infrared removal filter is for the purpose of removing infrared light from reaching the single-chip color image sensor (120) and is affixed before the optical low pass filter and is configured of a single layer glass block.

The color filter array (121) of the single-chip color image sensor (120) is arrayed on top of the imaging elements (122) pixel light receptor surface in the specified regular pattern and has a role of filtering the received image light into the specified color components. In this embodiment, for the color components, a three color (R, G & B) primary color Bayer color filter array (121).

Figure 2:
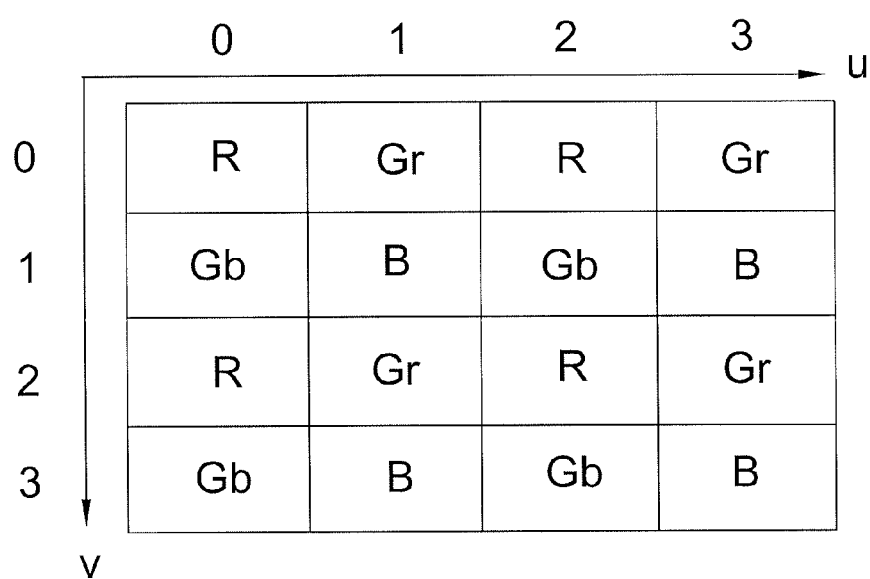
FIG. 2 is a diagram indicating the Bayer array of primary color filters for the $1^{st}$~$5^{th}$ embodiments of this invention.

The primary color Bayer array, as indicated in FIG. 2, has the R color filter and B color filter alternating rows with each other in addition to the G color filter being arrayed in a checker board pattern. Moreover, for the G color filter, there are filters named Gr and Gb color filters with the Gr color filters being between R color filters in the horizontal direction and the Gb color filters being between B color filters in the horizontal direction.

The roles of the imaging elements (122) is to convert, in a photoelectrical manner, the received optical image into pixel information, storing it as an electric charge and outputting this electric charge to the A/D conversion unit (130). The imaging elements (122) has a plurality of pixel (photo diodes) arrayed in the specified pattern and on top of each of the pixel's light receptor surface the above mentioned primary color Bayer color filter array (121) is overlaid in a regular pattern.

In the above configuration, the light of the photographed subject passes through the imaging optics (110) and forms an image on the imagining elements (122) of the single-chip color image sensor (120). At that time, due to the various inherent aberrations of the imaging optics (110), the image formed of the photographed object suffers deterioration. For example, the straight lines on the photographed object become curved lines on the image due to distortion aberration.

The single-chip color image sensor (120) converts the photographed image on the imaging elements (122) into a color mosaic image as an analog electrical signal.

In other words, the color filter array (121) is, as shown in FIG. 2, a primary color Bayer array and the RGB (each) color filter is lined up over each pixel of the imaging elements (122). Therefore, the image light of the photographed subject is passed to each pixel as a color mosaic image with only the color component for that pixel being passed to the imaging elements (122). The imaging elements (122) then converts, in a photoelectrical fashion, the received light and outputs it as a color mosaic image electric signal to the A/D conversion unit (130).

The A/D conversion unit (130) processes the photo optically converted analog color mosaic signal from the imaging elements (122) into a digital output signal. Moreover, at the A/D conversion unit (130), directly after conversion, this color mosaic data is also called the RAW DATA. The demosaic unit (140) converts the color mosaic image into a color image. In this present embodiment, by performing image distortion processing at this time, simultaneously, the above mentioned image deterioration from the imaging optics (110) distortion aberration is corrected. The imaging processing method of this demosaic unit (140) is explained in detail later.

The visual correction unit (150) processes the color mosaic image generated by the demosaic unit (140) mainly to improve the appearance of the image. For example, such image correction processing as tone curve (gamma) correction, color saturation enhancement and edge enhancement is done by the visual correction unit (150). The compression unit (160) takes the visual correction unit (150) correct image and compresses it using such method as the JPEG (Joint Photographic Experts Group) method to reduce its size at recording time. The recording unit (170) records the compressed digital image signal to flash memory or other recordable media (no Figure illustration).

Furthermore, each of the constituent components from the demosaic unit (140) to the recording unit (170) may be configured as a separate device or as a single microprocessor device. If the latter case, the single microprocessor executes all the processing of the constituent configuration from the demosaic unit (140) through the recording unit (170).

Figure 3:
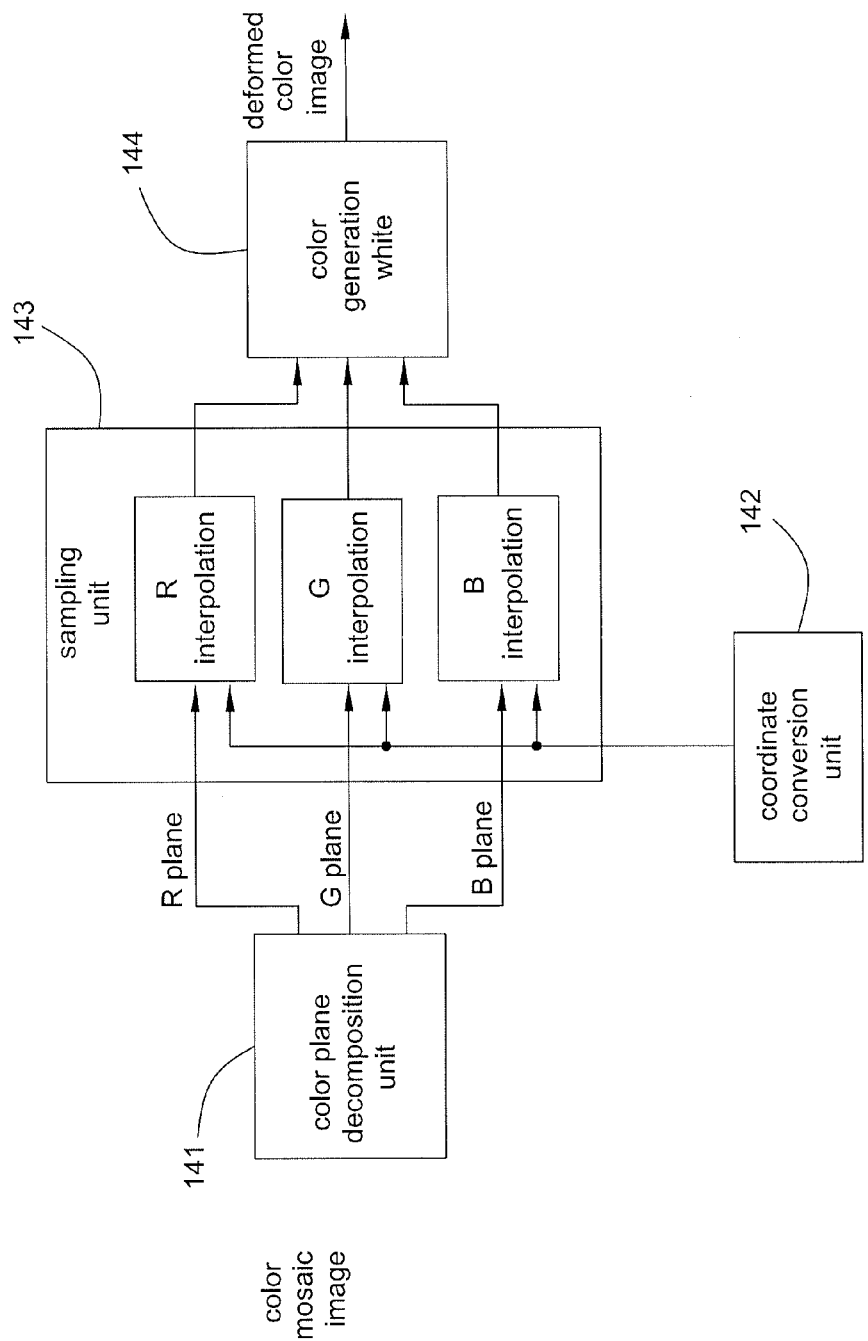
FIG. 3 is a block diagram showing a schematic configuration of the demosaicing unit of the $1^{st}$ embodiment.

FIG. 3 is a block diagram illustration of a demosaic unit (140) functional configuration example.

Figure 4:
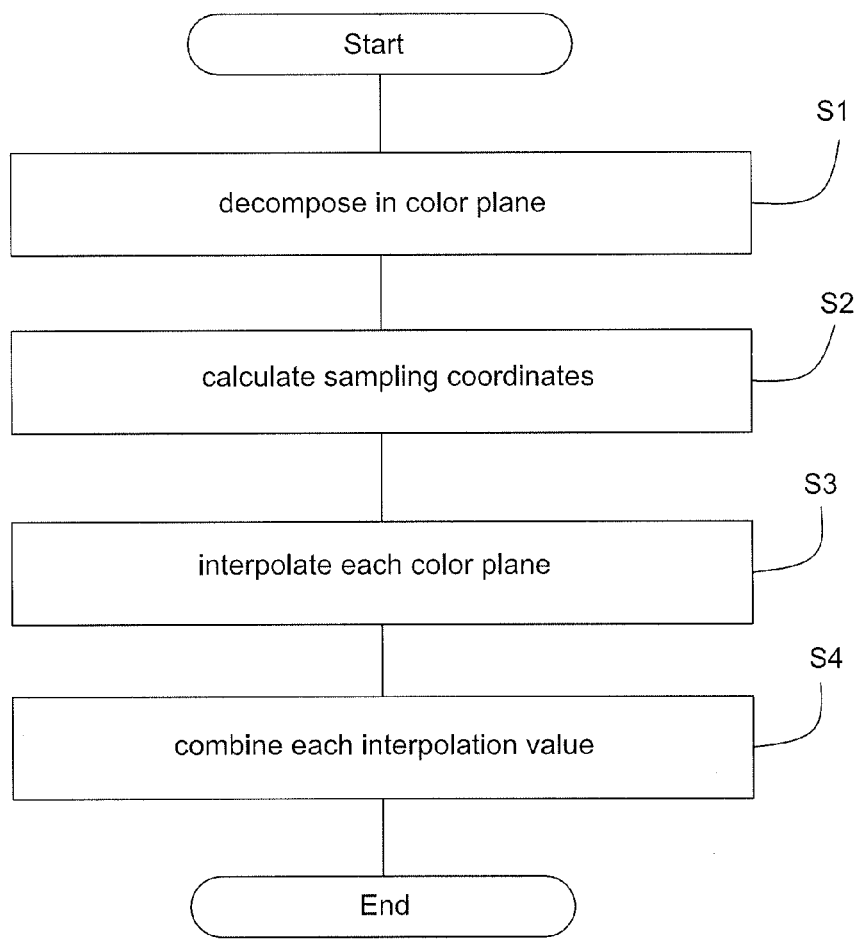
FIG. 4 is a flow diagram illustrating an image processing operation example of demosaicing of the $1^{st}$ embodiment.
Figure 5:
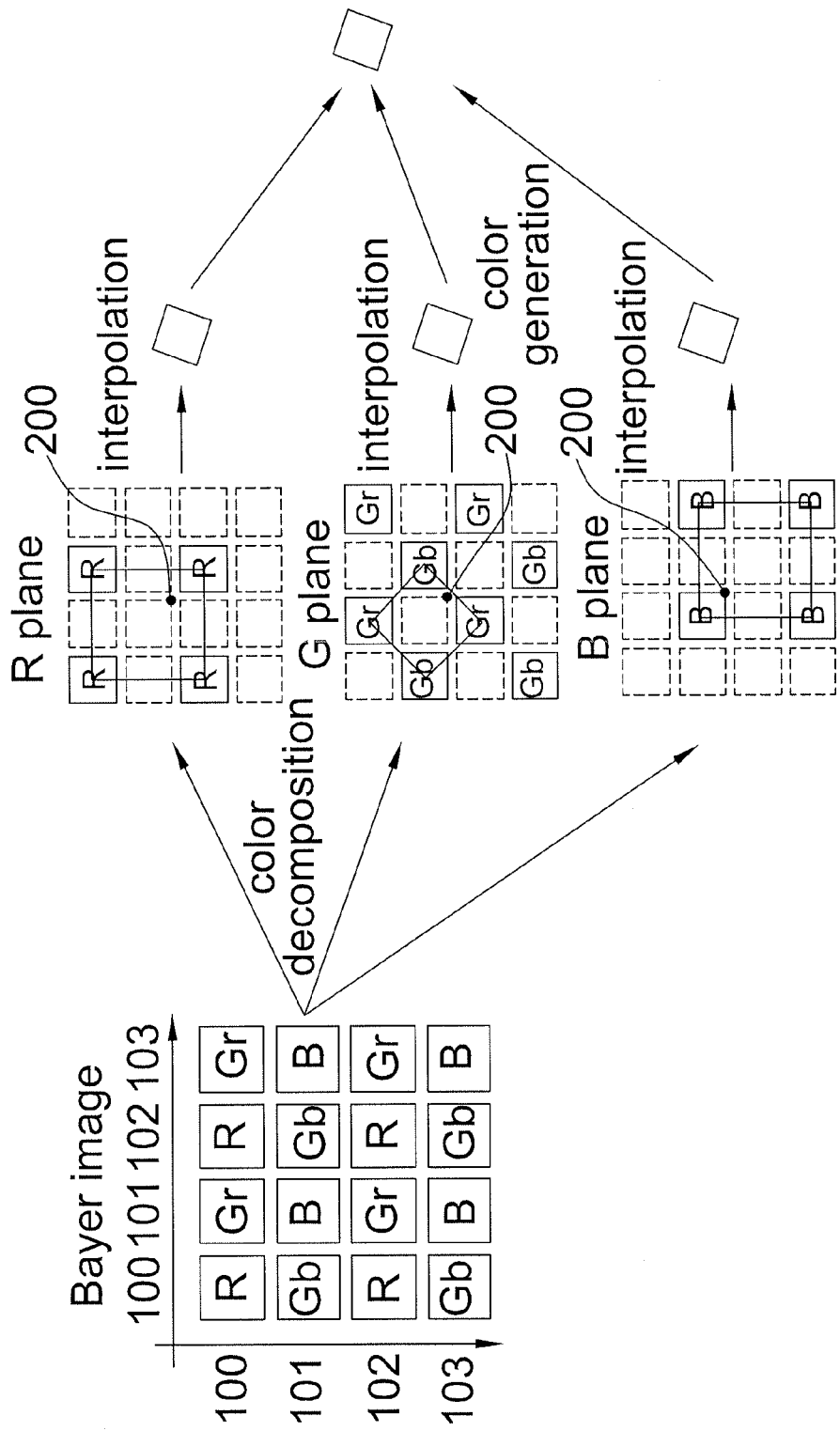
FIG. 5 is an image diagram that concretely illustrates and explains an image processing example of the demosaicing unit of the $1^{st}$ embodiment.

FIG. 4 is a flow chart illustration of an example of the image processing operation executed by the demosaic unit (140). FIG. 5 is an image diagram to concretely explain the content of the image processing executed by the demosaic unit (140). As can be seen in FIG. 3, the demosaic unit (140) is equipped with, as functional constituents, the color plane decomposition unit (141), the coordinate conversion unit (142), the sampling unit (143) and the color generation unit (144).

The color plane decomposition unit (141) separates the color mosaic image output from the A/D conversion unit (130) into multiple color planes having the same chromatic light pixel value (FIG. 4 Step S1). In this embodiment, as indicated in FIG. 5, the color planes are separated into a R plane with only the R component pixels, the G plane with only the G component pixels and the B plane with only the B component pixels for a total of 3 color planes. Each of the separated color planes is used for the processing by the sampling unit (143).

The coordinate conversion unit (142), using the coefficient of the expression of the image distortion of the color image, from the pixel position generated from the color mosaic image, calculates the color mosaic image sampling coordinates (FIG. 4 Step S2) when distortion processing (hereinafter "deformed color image") is executed for the color image.

For example, in order to correct color image distortion due to imaging optics (110) aberration, a non-linear coordinates conversion of the deformed color image generation of the color mosaic image is performed. This coordinates conversion method is known art and the pixel position on the deformed color image and the position of that on the color mosaic image (sampling coordinates) can be sought by calculations.

Below is a detailed explanation of the calculation procedure for the sampling coordinates. First, for the xy coordinate system, the origin point 1 is the image center, the maximum image height (maximum distance from the origin point) with the plus x coordinates being in the right direction from the origin point and the plus y coordinates being in the down direction of the screen from the origin point. In this case, for a 640×480 pixel square color image, if the uv coordinates system pixel coordinates $(u_d, v_d)$, are assigned as seen in FIG. 2 start from the upper left of the screen and go in the right direction as (0,0), (1,0), (2,0)..., and continue to the next row as (1,0),(1,1),(2,1)... then the uv coordinates system pixel coordinates (319.5, 239.5) are the origin point of the xy coordinates system. Also, for the pixel coordinates system's deflection angle half-length $400=(640^2+480^2)^{1/2}/2$ the corresponding xy coordinates system maximum height, xy coordinates $(x_d, y_d)$ must be as in the relational expression shown below for handling pixel coordinates $(u_d, v_d)$.

$$x_d=(u_d-319.5)/400$$

$$y_d=(v_d-239.5)/400$$

The formula listed below is used for the xy coordinates $(x_d, y_d)$ corresponding coordinates conversion with consideration of correction of the imaging optics (110) distortion aberration.

$$x=x_d(k_1r^2+k_2r^4)$$

$$y=y_d(k_1r^2+k_2r^4)$$

(However, $r^2=x_d^2+y_d^2$)

Moreover, $\{k_1,k_2\}$ is the coefficient indicating the imaging optics (110) distortion aberration with $k_1$ being the $3^{rd}$ aberration coefficient and $k_2$ the $5^{th}$ aberration coefficient. As stated above, the conversion method of non-linear coordinates of color images with distortion aberration is known art, and it is possible to use such things as simulations to seek the distortion aberration coefficient $\{k_1, k_2\}$. This distortion aberration coefficient $\{k_1, k_2\}$ is equivalent to this invention's image distortion coefficient.

On the other hand, if the color mosaic image is made of a 1600×1200 pixel square and if the pixel coordinates $(u_s, v_s)$ of the uv coordinates system is assigned in the same manner as that noted for the above color image, the uv coordinates system's pixel coordinates (799.5, 599.5) are the origin point for the xy coordinates and the coordinates deflection angle half-length is $1000=(1600^2+1200^2)^{1/2}/2$, corresponding to the xy coordinates system maximum image height. Due to this, the color mosaic image pixel coordinates $(u_s, v_s)$ corresponding to the deformed color image xy coordinates (x,y) are as shown below.

$$u_s=1000*x+799.5$$

$$v_s=1000*y+599.5$$

The above noted calculations results, as the pixel coordinates $(u_s, v_s)$ are not limited to an integer value, are generally non-integral. These color mosaic image pixel coordinates $(u_s, v_s)$ are sampling coordinates. In FIG. 5 one of these sampling coordinates is shown by the 200 code. In the manner as noted above, the color mosaic image is separated into 3 color planes. In FIG. 5 the sampling coordinates 200 on each of the color planes is illustrated. As noted above, since the sampling coordinates value is a non-integer, the sampling coordinates 200 position is offset from the pixel center.

The sampling unit (143), for each of the plurality of color planes separated by the color plane decomposition unit (141), generates an interpolation from the pixel value (sampling value) of the same color within the color plane for the sampling coordinates 200 calculated by the coordinate conversion unit (142) (FIG. 4 Step S3). In other words, the sampling unit (143) outputs the sampling coordinates 200 pixel value of each of the R plane, G plane and B plane from interpolation calculation.

As noted above, as the value for the sampling coordinates 200 $(u_s, v_s)$ is not always necessarily an integer value, linear interpolation is performed from the 4 pixel content (the same color light pixel value that each color plane originally had) surrounding the aforementioned sampling coordinates 200.

This linear interpolation is preferably performed with bilinear interpolation.

As indicated in FIG. 5, as both the R and B planes have a crisscross lattice point shape for pixel content, the position of the four pixels surrounding the aforementioned sampling contents 200 is at the apex of length of each side of the 2 square. For example, if the sampling coordinates 200 is $(u_s, v_s)=(100.8, 101.4)$ then, in the R plane the four pixels $(u_d, v_d)=(100, 100), (100, 102), (102, 100), (102, 102)$ that surround it is the R plane pixel content.

Figure 6:
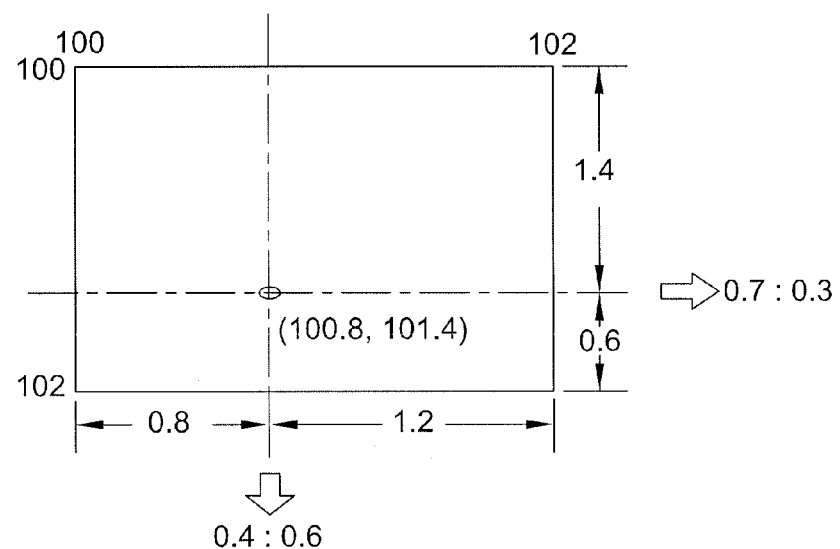
FIG. 6 is an image diagram that explains the bilinear interpolation of the $1^{st}$ embodiment.

When each pixel value of the aforementioned pixel content is expressed by R (100, 100), R (100, 102), R (102, 100), R (102, 102), then the sampling coordinate 200 interpolation pixel content value R (100.8, 101.4) on the R plane, generated by bilinear interpolation as in FIG. 6, is expressed by the formula shown below.

$$R(100.8, 101.4)=0.6*0.3*R(100, 100)+\\0.6*0.7*R(100, 102)+0.4*0.3*R(102, 100)+\\0.4*0.7*R(102, 102)$$

Also, in the B plane, the position of the four pixels $(u_d, u_v)=(99, 101), (99, 103), (101, 101), (101, 103)$ surrounding the sampling coordinates 200 position $(u_s, v_s)=(100.8, 101.4)$ is the B plane pixel content. When each pixel value of the aforementioned pixel content is expressed by B (99, 101), B (99, 103), B (101, 101), B (101, 103), then the sampling coordinate 200 interpolation pixel content value B (100.8, 101.4) on the B plane is expressed by the formula shown below.

$$B(100.8, 101.4)=0.1*0.8*B(99, 101)+0.1*0.2*\\B(99, 103)+0.9*0.8*B(101, 101)+0.9*0.2*\\B(101, 103)$$

On the other hand, as the G plane has a checkerboard pattern for pixel content, the position of the four pixels surrounding the aforementioned sampling contents 200 is at the apex of length of each side of the square inclined at the of √2 of 45°. In this case the sampling coordinates 200 position in the G plane is $(u_s, v_s)=(100.8, 101.4)$ then the four pixels $(u_d, v_d)=(100, 100), (101, 100), (101, 102), (102, 101)$ that surround it is the G plane pixel content.

When each pixel value of the aforementioned pixel content is expressed by G (100, 101), G (101, 100), G (101, 102), G (102, 101), then the sampling coordinate 200 interpolation pixel content value G (100.8, 101.4) on the G plane generated by interpolation is expressed by the formula shown below.

$$G(100.8, 101.4)=0.7*0.3*G(100, 101)+0.3*0.3*\\G(101, 100)+0.7*0.7*G(101, 102)+0.3*0.7*\\G(102, 101)$$

The color generation unit (144) with the synthesis of the interpolation generation color plane pixel value for each color plane of the sampling unit (143) generates a color image having the luminance information of each of the plurality of the pixel values (FIG. 4 Step S4). For example, if for 1 sampling coordinates $(u_s, v_s)$ the interpolation value sought for each color plane by the sampling unit (143) is, each R $(u_s, v_s)$ G $(u_s, v_s)$ B $(u_s, v_s)$ then the color information of the sampling coordinates $(u_s, v_s)$ is generated from a synthesis of these three interpolations by the color generation unit (144).

Furthermore, the color generation unit (144) converts the RGB color information found in this manner into YUV color information (U is luminance level information and U, V are color information) and puts U. V through a low pass filter. Moreover, it is possible to use public knowledge processes for the RGB to YUV conversion process and the low pass filter process for U, V.

The color generation unit (144) does the above processing for all pixels of deformed color image (all sampling coordinates) and outputs the obtained from the deformed color image to the visual correction unit (150). The processing after the visual correction unit (150) is performed exactly as noted above.

As explained in detail above, in the $1^{st}$ embodiment, as the prior step for the generation of the deformed color image from the color mosaic image, the sampling coordinates 200 of the color mosaic image that corresponds to the output deformed color image pixel position is calculated. Next, the deformed color image pixel value is generated using interpolation calculation of the color mosaic image pixel value in the aforementioned sampling coordinates 200.

By doing so, the color interpolation processing generating the color image from the color mosaic image and the aforementioned color image distortion processing can be realized at the same time with just one interpolation calculation. Due to this, in addition to being able to lessen the burden of the processing when generating the deformed color image from the color mosaic image the deterioration of image quality caused by the double interpolation required with the traditional method can be suppressed.

Also, in the $1^{st}$ embodiment, as the color mosaic image is split into R, G and B color planes and the sampling coordinates 200 interpolation pixel value is sought for each color plane, a synthesized value for the luminance of the 3 colors in one pixel is included and the color information generated. By doing it in this manner, the sampling coordinates 200 interpolation pixel value can be sought with a simple linear interpolation from the same color luminance in each color plane and the processing burden lessened.

Furthermore, in the above noted $1^{st}$ embodiment, although we explained with examples of the color plane decomposition unit (141) separating the color mosaic image into three color (R, G and B) planes it is not limited to just this.

Figure 7:
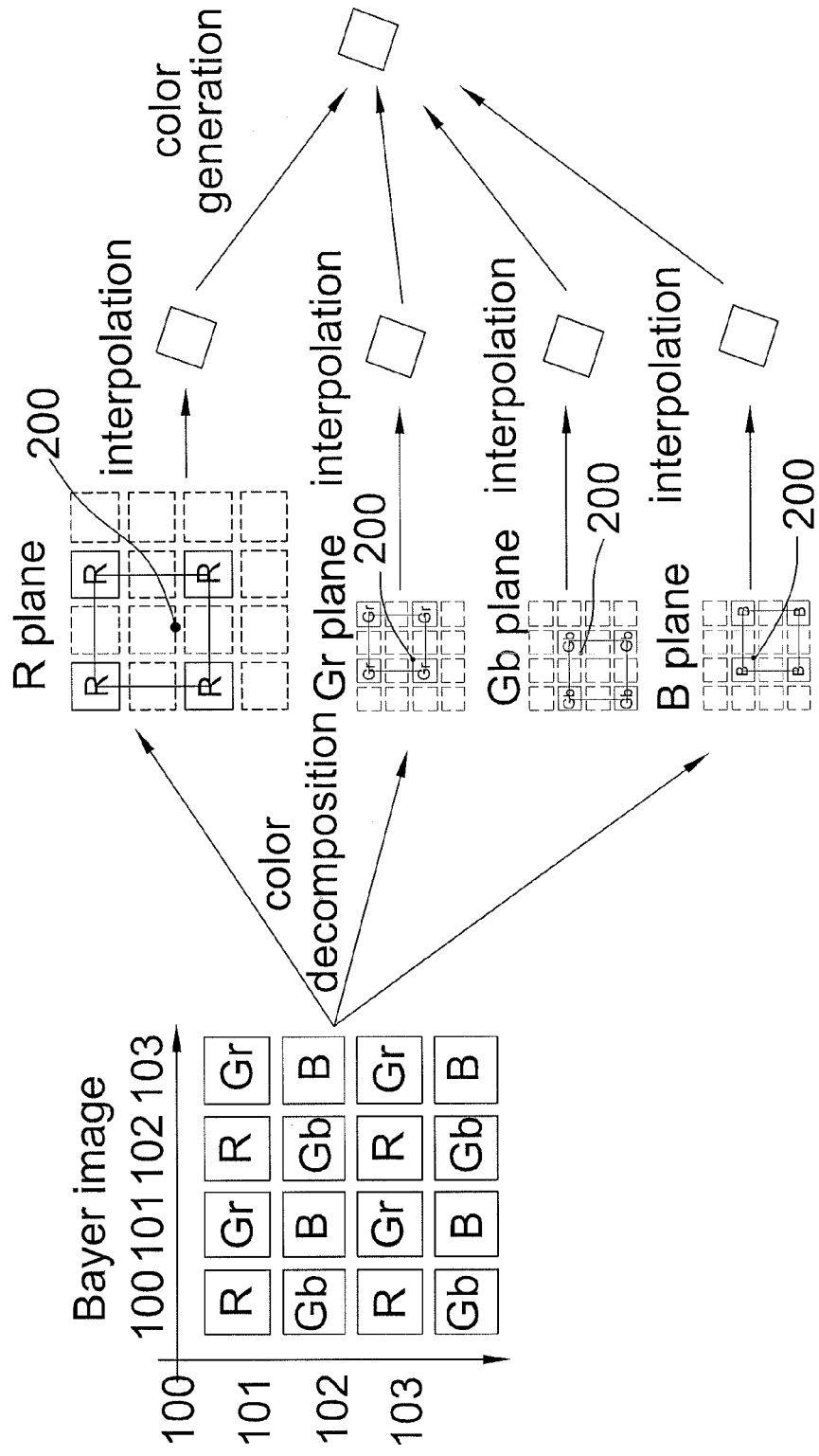
FIG. 7 is an image diagram that concretely illustrates and explains another image processing example of the demosaicing unit of the $1^{st}$ embodiment.

For example, as shown in FIG. 7, it is possible to separate two kinds of green pixels (Gr and Gb) to different color planes. In other words, the color plane decomposition unit (141) takes the color mosaic image output from the A/D conversion unit (130) and separates it into four different color planes, the R plane with only the R component pixels, the Gr plane with only the Gr component pixels, the Gb plane with only the Gb component pixels and the B plane with only the B component pixels.

In this case, the color generation unit (144) adds the sampling coordinates 200 pixel value in the Gr and Gb planes (sampling value) generated by the sampling unit (143) and generates the color information including individual R,G and B component luminance information within 1 pixel. For example, the R component or B component sampling value is used as is while the G component value is the average value of Gr and Gb.

Also, when the sampling coordinates 200 pixel value is calculated after separating the G component into the Gr plane and the Gb plane, and the demosaic unit (140) calculates the difference in the sampling unit (143) generated interpolation value of the Gr and Gb plane, it is possible to add a pseudo-color judgment unit and, in accordance with the aforementioned interpolation pixel value difference judge the presence or lack of pseudo-color.

The Bayer array single-chip color image sensor (120) has a problem with red and blue pseudo-color generation for black and white stripe patterns near the Nyquist frequency. By subtracting the difference between the sampling coordinates 200 interpolation pixel value of the Gr plane and the sampling coordinates 200 interpolation pixel value of the Gb plane, the presence of pseudo-color on the stripe pattern can be detected and if pseudo-color is detected it can be suppressed.

In other words, as the filter for both Gr and Gb is normally the same G color filer, the interpolation pixel value of the Gr plane and the Gb plane should both be the same value.

Figures 21, 22, 23:
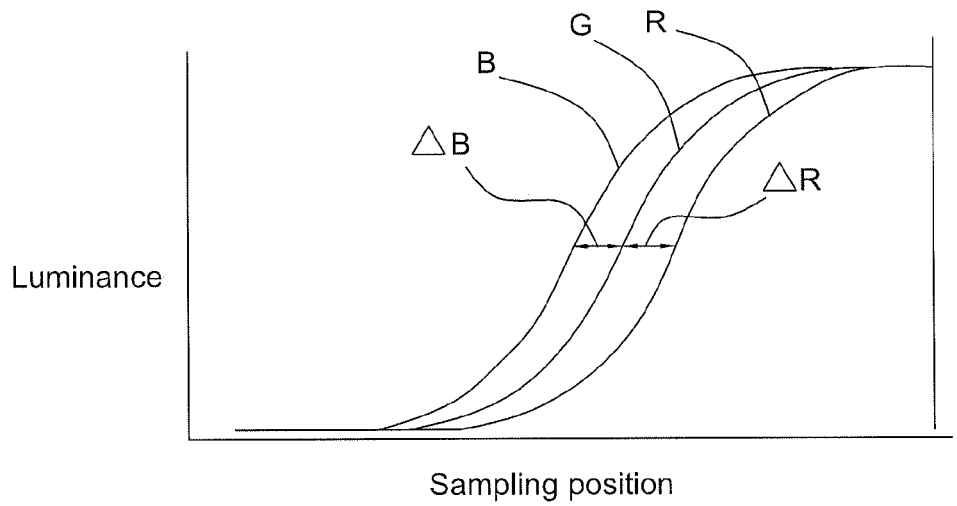
FIG. 21 is a diagram explaining the color shifting from magnification chromatic aberration.
FIG. 22 shows the formula used when converting the RGB color (taking the suppression of false color into consideration) information into YUV color information.
FIG. 23 is a diagram showing the relational expression for the XY coordinates and the UV coordinates.

However, if pseudo-color is occurring there is a difference in the found interpolation pixel values for the Gr and Gb planes. Therefore, by looking at the interpolation pixel value difference a pseudo-color occurrence can be detected. In cases where pseudo-color presence is determined the color generation unit (144) performs a conversion, at the RGB color information to YUV color information conversion processing, with suppression of the pseudo-color using the formula as shown in FIG. 22.

As explained above, in the 1$^{st}$ embodiment, as an example of color image distortion processing, skew correction was explained in detail but it is not limited to just this. For example, in place of the above noted skew correction for image distortion, or in addition to it, when at least one of magnification, reduction or rotation is included in the color image processing it is possible to use the demosaic unit (140) of this embodiment. In this case, it is possible for the enlargement, reduction or rotation to be expressed by affine transformation and be used for the image distortion coefficient.

(2$^{nd}$ Embodiment)

Figure 8:
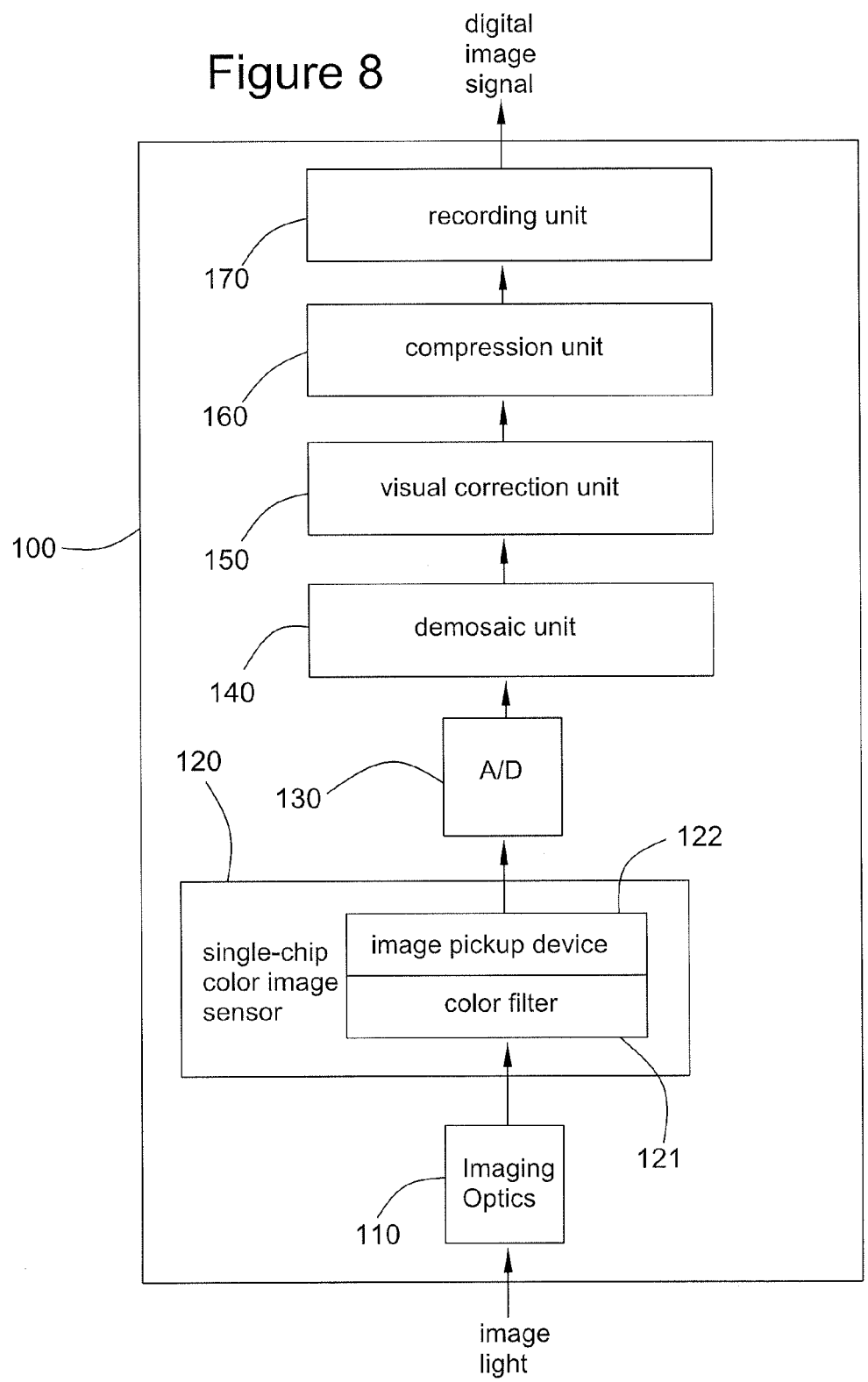
FIG. 8 is a diagram showing a schematic configuration of the color imaging apparatus of the $2^{nd}$ and $3^{rd}$ embodiments of this invention's image processing device.

The 2$^{nd}$ embodiment of this present invention will be described in accordance with the accompanying drawings. FIG. 8 is a diagram illustrating a schematic configuration of a color image apparatus (100) according to the 2$^{nd}$ embodiment of the present invention. The color image apparatus (100) of the embodiment is comprised of imaging optics (110), single-chip color image sensor (120), A/D conversion unit (130), demosaic unit (140), visual correction unit (150), compression unit (160) and a recording unit (170). Of these, the demosaic unit (140) corresponds to the image processing apparatus of the present invention. Moreover, the code symbols that have the same code as those in FIG. 1 indicates the same function so we will not repeat their explanation here.

In the 2$^{nd}$ embodiment, the photographed object image goes through the imaging optics (110) and forms an image on the imaging elements (122) of the single-chip color image sensor (120).

At this time, due to the magnification chromatic aberration of the imaging optics (110), for each RGB color component image shifting (color shifting) on the imaging elements (122) occurs. The demosaic unit (140) converts the color mosaic image into a color image. In this embodiment, through the processing of the magnification chromatic aberration correction at the same time, the color shifting of the magnification chromatic aberration of the above noted imaging optics (110) is corrected.

Figure 9:
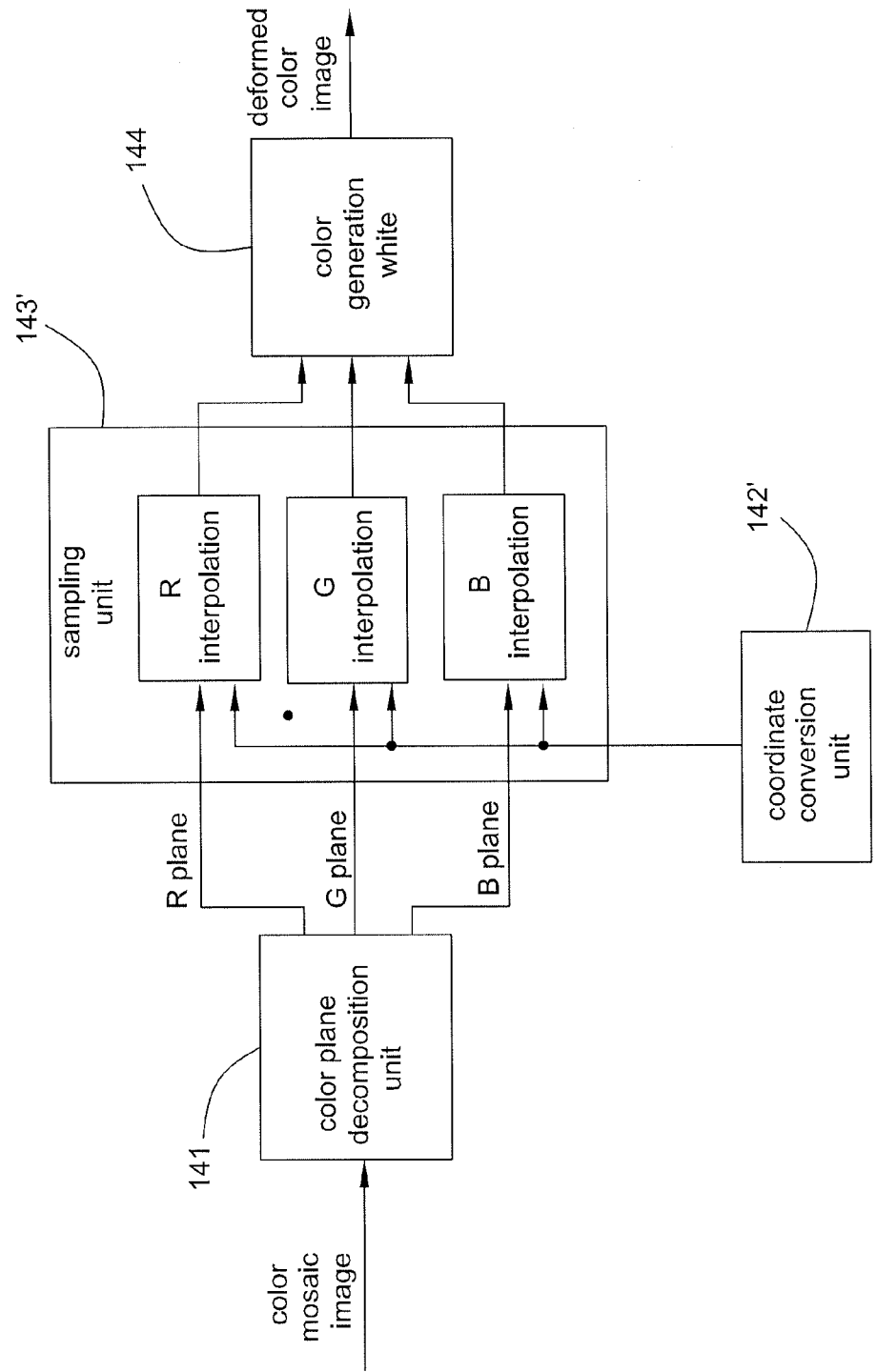
FIG. 9 is a block diagram showing a schematic configuration of the demosaic unit of the $2^{nd}$ and $3^{rd}$ embodiments.

FIG. 9 is a block diagram illustration of a demosaic unit (140) functional configuration example.

Figure 10:
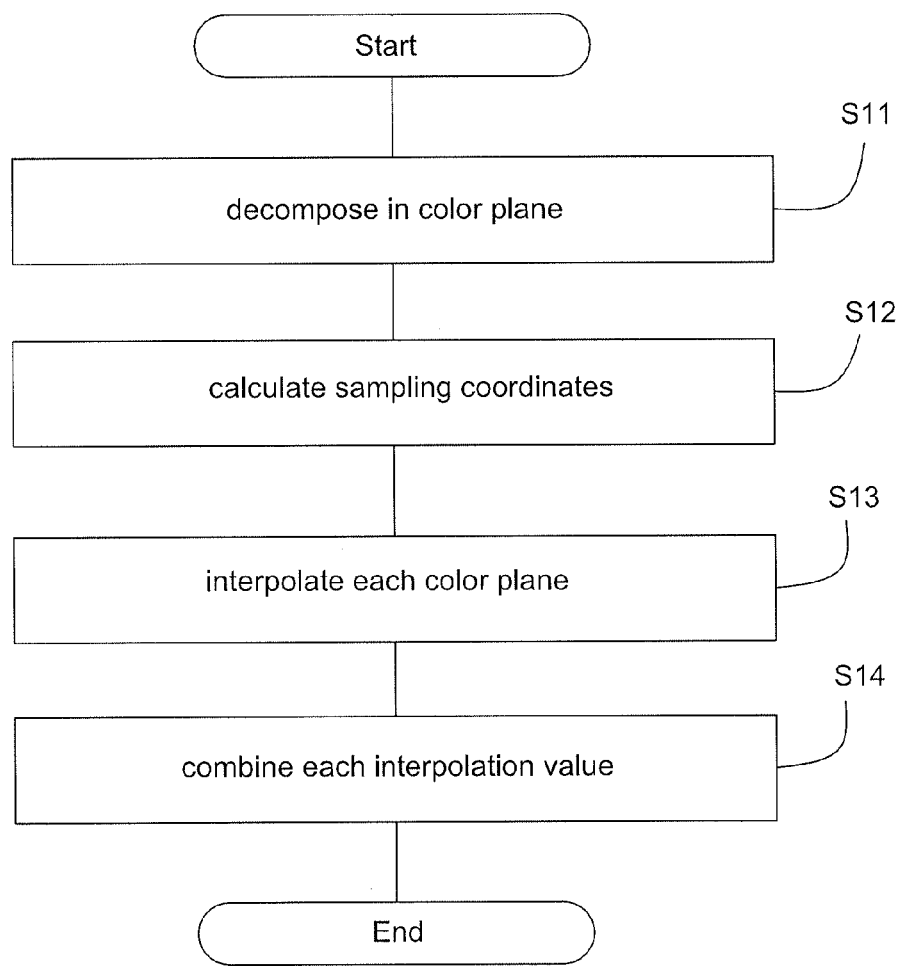
FIG. 10 is a flow diagram illustrating an image processing operation example of demosaicing of the $2^{nd}$~$5^{th}$ embodiments.
Figure 11:
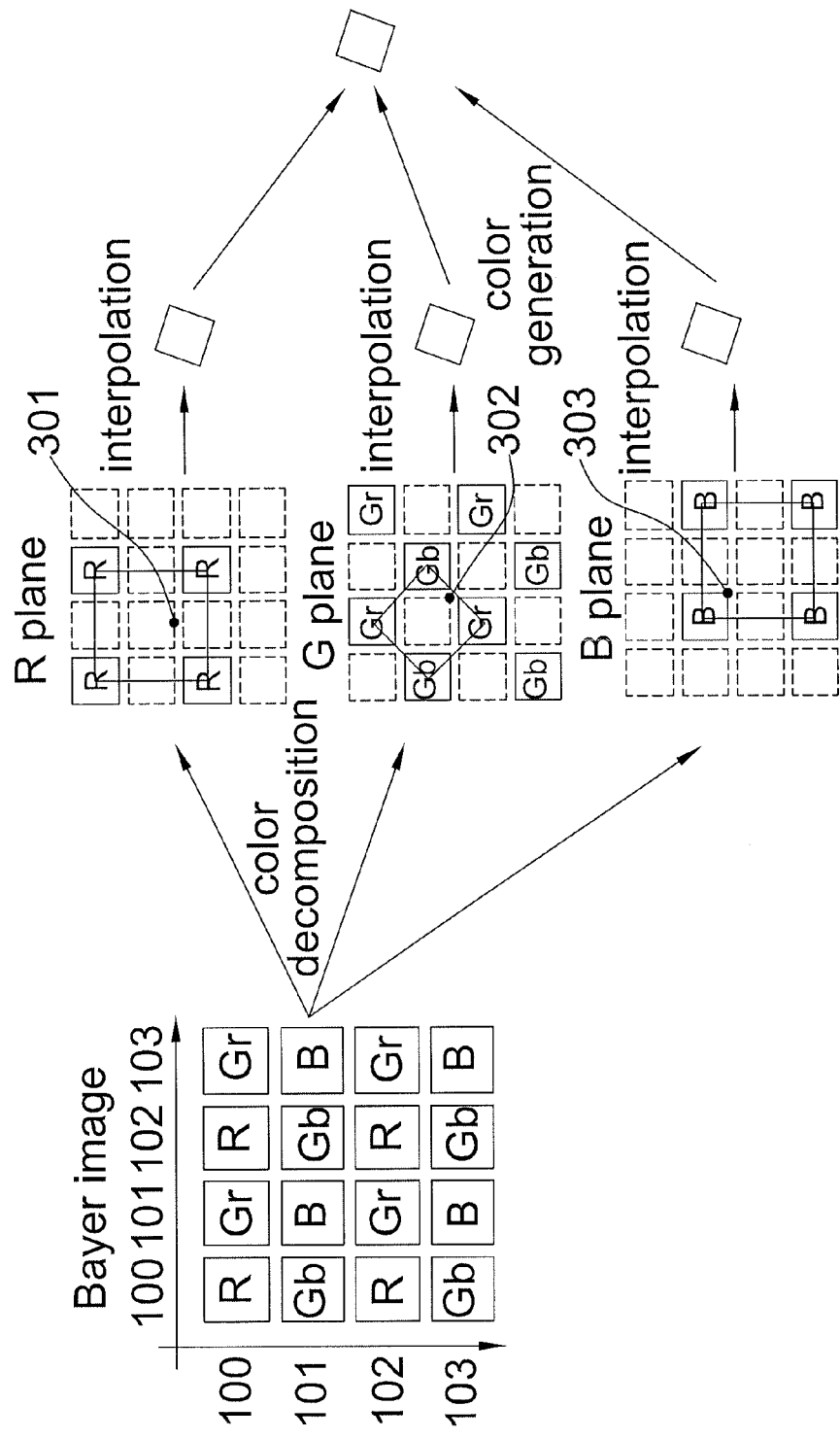
FIG. 11 is an image diagram that concretely illustrates and explains an image processing example of the demosaic unit of the $2^{nd}$ and $3^{rd}$ embodiments.

FIG. 10 is a flow chart illustration of an example of the image processing operation executed by the demosaic unit (140). FIG. 11 is an image diagram to concretely explain the content of the image processing executed by the demosaic unit (140).

As can be seen in FIG. 9, the demosaic unit (140) is equipped with, as functional constituents, the color plane decomposition unit (141), the coordinate conversion unit (142), the sampling unit (143) and the color generation unit (144). Moreover, the code symbols in FIG. 9 that have the same code as those in FIG. 3 have the same functions so we will concentrate on explaining the different parts.

The color plane decomposition unit (141) separates, as shown in FIG. 11, the color mosaic image output from the A/D conversion unit (130) into multiple color planes having the same chromatic light pixel value—R plane with only R pixels, G plane with only G pixels and B plane with only B pixels (FIG. 10 Step S11).

The coordinate conversion unit (142), using the coefficient of the expression of the image distortion of the color image, from the pixel position generated from the color mosaic image, calculates the color mosaic image sampling coordinates (FIG. 10 Step S12) when distortion processing (hereinafter "deformed color image") is executed for the color image. In this embodiment especially, the coordinates unit (142), for each of the plurality of color planes separated by the color plane decomposition unit (141), using a different chromatic aberration coefficient for the values of each color plane, calculates the differing color planes sampling coordinates. In other words, although there is an effect from the magnification chromatic aberration of the imaging optics (110), in order to not have that effect expressed in the color image, the sampling coordinates are given different values for the color plane corresponding to the differing color light.

Below is a detailed explanation of the 2$^{nd}$ embodiment's calculation procedure for the sampling coordinates. Moreover, the xy coordinates system considered here are the same as those of the 1$^{st}$ embodiment and the xy coordinates ($x_d$, $y_d$) corresponding to the pixel coordinates ($u_d$, $v_d$) are expressed by the relational expression shown below.

$$x_d = (u_d - 319.5)/400$$

$$y_d = (v_d - 239.5)/400$$

The imaging optics (110) magnification chromatic aberration corrected coordinates conversion for these xy coordinates ($x_d$, $y_d$) is performed using the formula shown below. Here the coordinates conversion is done separately for each of the three color planes, the R plane, G plane and B plane.

$$x_R = x_d * k_R, y_R = y_d * k_R$$

$$x_G = x_d * 1, y_G = y_d * 1$$

$$x_B = x_d * k_B, y_B = y_d * k_B$$

Moreover, $\{k_R, k_B\}$ is the coefficient indicating the imaging optics (110) magnification chromatic aberration, $k_R$ being the R component magnification ratio of the G component and $k_B$ being the B component magnification ratio for the G component. It is possible for these chromatic aberration coefficients $\{k_R, k_B\}$ to be calculated by optical simulation or other means.

On the other hand, if the color mosaic image is made of a 1600×1200 pixel square and if the pixel coordinates $(u_s, v_s)$ of the uv coordinates system is assigned in the same manner as that noted for the above color image, the uv coordinates system's pixel coordinates (799.5, 599.5) are the origin point for the xy coordinates and the coordinates deflection angle half-length is $1000=(1600^2+1200^2)^{1/2}/2$, corresponding to the xy coordinates system maximum image height. Due to this, the color mosaic image pixel coordinates $(u_{sR}, v_{sR})$ $(u_{sG}, v_{sG})$ $(u_{sB}, v_{sB})$ corresponding to the corrected chromatic aberration color image xy coordinates $(x_R, y_R)$, $(x_G, y_G)$ and $(x_B, y_B)$ on each color plane corresponding to the color image pixel coordinates are as shown below.

$$u_{sR}=1000*x_R+799.5$$

$$v_{sR}=1000*y_R+599.5$$

$$u_{sG}=1000*x_G+799.5$$

$$v_{sG}=1000*y_G+599.5$$

$$u_{sB}=1000*x_B+799.5$$

$$v_{sB}=1000*y_B+599.5$$

The above noted calculations results, as the pixel coordinates $(u_{sR}, v_{sR})$, $(u_{sG}, v_{sG})$ and $(u_{sB}, v_{sB})$ are not limited to an integer value, are generally non-integral. These color mosaic image pixel coordinates $(u_{sR}, v_{sR})$, $(u_{sG}, v_{sG})$ and $(u_{sB}, v_{sB})$ are sampling coordinates for each color plane. In FIG. 11 the R plane sampling coordinates is shown by the 301 code, the G plane sampling coordinates is shown by the 302 code and the B plane sampling coordinates is shown by the 303 code. As noted above, since the sampling coordinates value is a non-integer, the sampling coordinates 301, 302 and 303 position location is offset from the pixel center in each color plane.

The sampling unit (143), for each of the plurality of color planes separated by the color plane decomposition unit (141), generates an interpolation from the pixel value (sampling value) of the same color within the color plane for the sampling coordinates 301,302 and 303 calculated by the coordinate conversion unit (142) (FIG. 10 Step S13). In other words, the sampling unit (143) outputs the sampling coordinates 301, 302 and 303 pixel value of each of the R plane, G plane and B plane from interpolation calculation.

As noted above, as the value for the sampling coordinates 301, 302 and 303 $(u_{sR}, v_{sR})$, $(u_{sG}, v_{sG})$ and $(u_{sB}, v_{sB})$ is not always necessarily an integer value, linear interpolation is performed from the 4 pixel content (the same color light pixel value that each color plane originally had) surrounding the aforementioned sampling coordinates 301, 302 and 303.

As indicated in FIG. 11, as both the R and B planes have a crisscross lattice point shape for pixel content, the position of the four pixels surrounding the aforementioned sampling contents 301, 303 is at the apex of length of each side of the 2 square. For example, if the sampling coordinates 301, 303 is $(u_{sR}, v_{sR})=(100.8, 101.4)$ then, in the R plane the four pixels $(u_d, v_d)=(100, 100), (100, 102), (102, 100), (102, 102)$ that surround it is the R plane pixel content When each pixel value of the aforementioned pixel content is expressed by R (100, 100), R (100, 102), R (102, 100), R (102, 102), then the sampling coordinate 301 interpolation pixel content value R (100.8, 101.4) on the R plane, generated by bilinear interpolation as in FIG. 6, is expressed by the formula shown below.

$$R(100.8, 101.4)=0.6*0.3*R(100,100)+0.6*0.7*R(100, 102)+0.4*0.3*R(102, 100)+0.4*0.7*R(102, 102)$$

On the other hand, as the G plane has a checkerboard pattern for pixel content, the position of the four pixels surrounding the aforementioned sampling contents 302 is at the apex of length of each side of the square inclined at the of √2 of 45°. In this case the sampling coordinates 302 position in the G plane is $(u_{sG}, v_{sG})=(101.0, 101.4)$ then the four pixels $(u_d, v_d)=(100, 101), (101, 100), (101, 102), (102, 101)$ that surround it is the G plane pixel content.

When each pixel value of the aforementioned pixel content is expressed by G (100, 101), G (101, 100), G (101, 102), G (102, 101), then the sampling coordinates 302 interpolation pixel content value G (101.0, 101.4) on the G plane generated by interpolation is expressed by the formula shown below.

$$G(101.0, 101.4)=0.7*0.3*G(100, 101)+0.3*0.3*G(101, 100)+0.7*0.7*G(101, 102)+0.3*0.7*G(102, 101)$$

The color generation unit (144) with the synthesis of the interpolation generation color plane pixel value for each color plane of the sampling unit (143) generates a color image having the luminance information of each of the plurality of the pixel values (FIG. 10 Step S14). Furthermore, the RGB color information found by the color generation unit (144) is converted into YUV color information (Y is luminance information and U, V is color information) and the U, V information goes through a low pass filter. Moreover, it is possible to accomplish this RGB to YUV conversion and low pass filter processing of U, V with public knowledge art. The color generation unit (144) performs the above processing for all pixel (all sampling coordinates) of the color image and the obtained deformed color image results are output to the visual correction unit (150). Processing from the visual correction unit (150) stage is exactly the same as noted above.

The sampling coordinates 301,302 and 303 R $(u_{sR}, v_{sR})$, G $(u_{sG}, v_{sG})$ and B $(u_{sB}, v_{sB})$ interpolation pixel values use in processing at the color generation unit (144) have magnification chromatic aberration color shifting considered and indicated the same exact part one the photographed object. Due to this, in the part where there is a black and white boundary, the R, G and B changes at the same time. In this manner a signal with a brilliant and sharp RGB synthesized color image can be obtained. In other words, a color image equivalent to one that was photographed with optics not having any magnification chromatic aberration can be obtained.

As explained in detail above, in the $2^{nd}$ embodiment, as the prior step for the generation of the deformed color image from the color mosaic image, the sampling coordinates 301 302 and 303 of the color mosaic image that correspond to the output deformed color image pixel position are calculated. Next, the deformed color image pixel value is generated using interpolation calculation of the color mosaic image pixel value in the aforementioned sampling coordinates 301 302 and 303.

By doing so, the color interpolation processing generating the color image from the color mosaic image and the aforementioned color image distortion processing can be realized at the same time with just one interpolation calculation. Due to this, in addition to being able to lessen the burden of the processing when generating the deformed color image from the color mosaic image the deterioration of image quality caused by the double interpolation required with the traditional method can be suppressed.

Also, in the $2^{nd}$ embodiment, as the color mosaic image is split into R, G and B color planes and the sampling coordinates 301 302 and 303 interpolation pixel value is sought for each color plane, a synthesized value for the luminance of the 3 colors in one pixel is included and the color information generated. By doing it in this manner, the sampling coordinates 301 302 and 303 interpolation pixel value can be sought with a simple linear interpolation from the same color luminance in each color plane and the processing burden lessened.

Furthermore, in the above noted $2^{nd}$ embodiment, although we explained with examples of the color plane decomposition unit (141) separating the color mosaic image into three color (R, G and B) planes it is not limited to just this.

Figure 12:
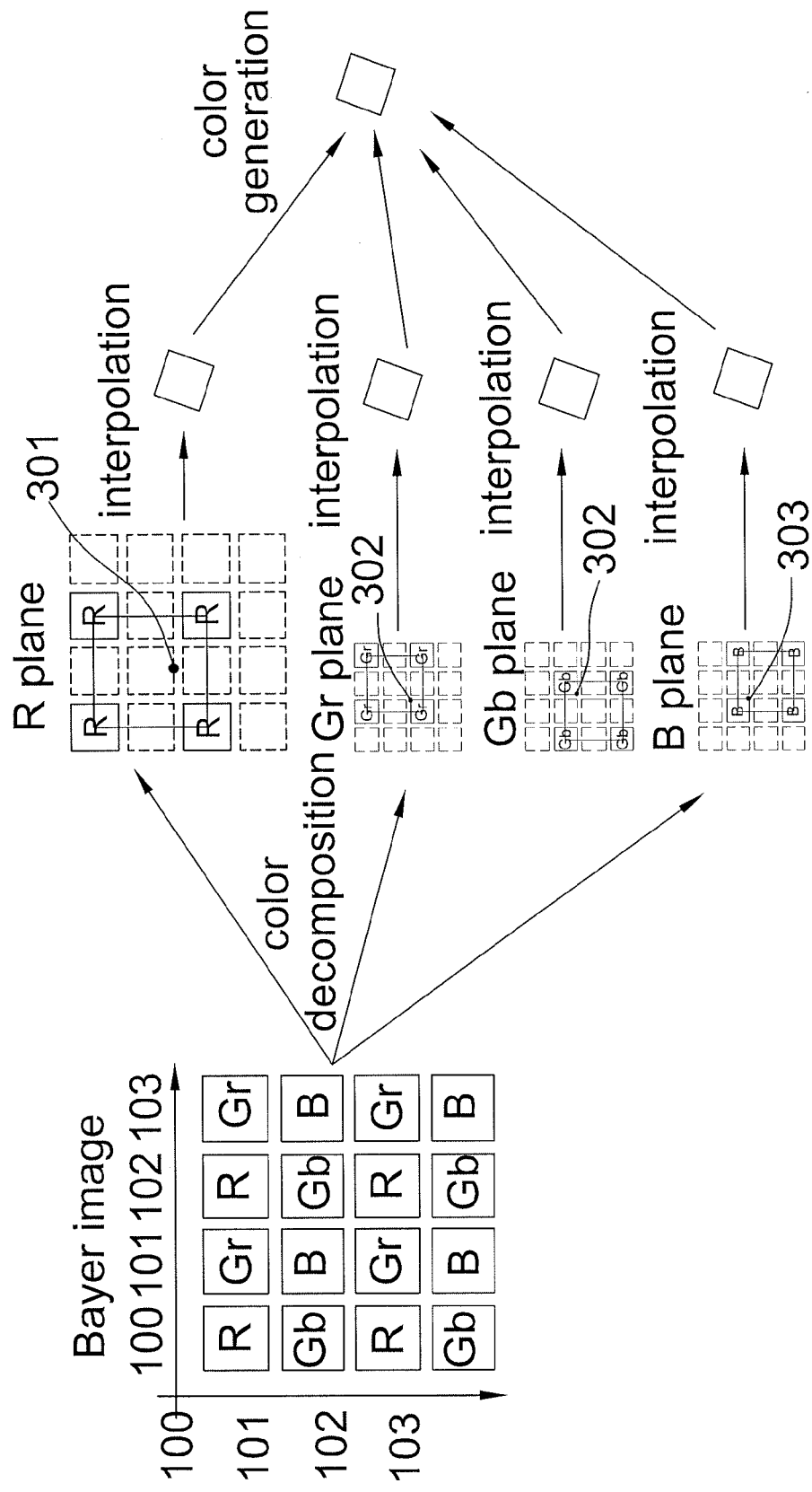
FIG. 12 is an image diagram that concretely illustrates and explains another image processing example of the demosaic unit of the $2^{nd}$~$5^{th}$ embodiments.

For example, as shown in FIG. 12, it is possible to separate two kinds of green pixels (Gr and Gb) to different color planes. In other words, the color plane decomposition unit (141) takes the color mosaic image output from the A/D conversion unit (130) and separates it into four different color planes, the R plane with only the R component pixels, the Gr plane with only the Gr component pixels, the Gb plane with only the Gb component pixels and the B plane with only the B component pixels.

In this case, the color generation unit (144) adds the sampling coordinates 302 pixel value in the Gr and Gb planes (sampling value) generated by the sampling unit (143) and generates the color information including individual R,G and B component luminance information within 1 pixel. For example, the R component or B component sampling value is used as is while the G component value is the average value of Gr and Gb.

Also, when the sampling coordinates 302 pixel value is calculated after separating the G component into the Gr plane and the Gb plane, and the demosaic unit (140) calculates the difference in the sampling unit (143) generated interpolation value of the Gr and Gb plane, it is possible to add a pseudo-color judgment unit and, in accordance with the aforementioned interpolation pixel value difference judge the presence or lack of pseudo-color.

The Bayer array single-chip color image sensor (120) has a problem with red and blue pseudo-color generation for black and white stripe patterns near the Nyquist frequency. By subtracting the difference between the sampling coordinates 302 interpolation pixel value of the Gr plane and the sampling coordinates 302 interpolation pixel value of the Gb plane, the presence of pseudo-color on the stripe pattern can be detected and if pseudo-color is detected it can be suppressed.

In other words, as the filter for both Gr and Gb is normally the same G color filer, the interpolation pixel value for the Gr plane and the Gb plane should both be the same value.

However, if pseudo-color is occurring there is a difference in the found interpolation pixel values for the Gr and Gb planes. Therefore, by looking at the interpolation pixel value difference a pseudo-color occurrence can be detected. In cases where pseudo-color presence is determined the color generation unit (144) performs a conversion, at the RGB color information to YUV color information conversion processing, with suppression of the pseudo-color using the formula as shown in FIG. 22.

($3^{rd}$ Embodiment)

The $3^{rd}$ embodiment of this present invention will be described in accordance with the accompanying drawings. FIG. 8 is a diagram illustrating a schematic configuration of a color image apparatus (100) according to the $3^{rd}$ embodiment of the present invention. Also, the functional configuration of the demosaic unit (140) is the same as that shown in FIG. 9.

However, the processing content performed by the coordinate conversion unit (142) that the demosaic unit (140) is equipped with is different than that of the $2^{nd}$ embodiment. Below, we will concentrate on explaining the parts that are different from those of the $2^{nd}$ embodiment.

In the $3^{rd}$ embodiment, the coordinate conversion unit (142) uses each of the differing chromatic aberration coefficients of the plurality of color planes that were separated by the color plane decomposition unit (141) and the image distortion coefficient for the image distortion of the color image and, from the color image pixel position, calculates the different sampling coordinates of each color plane for the sampling coordinates of the color mosaic image corresponding to the color image pixel position after chromatic aberration correction and image distortion is executed.

Here we will use an image distortion example to explain the distortion processing performed to correct distortion aberration of the imaging optics (110). If the imaging optics (110) has any distortion aberration, when the light of the photographed subject passes through the imaging optics (110) and forms an image on the imagining elements (122) of the single-chip color image sensor (120) there is image deterioration. In other words, for example, the straight lines on the photographed object become curved lines on the image due to distortion aberration. In this $3^{rd}$ embodiment, in addition to the correction of image deterioration from the magnification chromatic aberration, correction of distortion aberration can also be accomplished at the same time.

Due to this, from the color image pixel position generated from the color mosaic image, the coordinate conversion unit (142) calculates the sampling coordinates on each color plane on the color mosaic image that has had the magnification chromatic aberration and distortion aberration corrected. In more concrete detail, the coordinate conversion unit (142) uses the formulas shown below with the xy coordinates $(x_d + y_d)$ that have the corresponding imaging optics (110) chromatic aberration and distortion aberration correction (However, $r^2 = x_d^2 + y_d^2$).

$$x_R = x_d(k_g + k_1 r^2 + k_2 r^4) + 2p_1 x_d y_d + p_2(r^2 + 2x_d^2)$$

$$y_R = y_d(k_g + k_1 r^2 + k_2 r^4) + 2p_2 x_d y_d + p_1(r^2 + 2y_d^2)$$

$$x_G = x_d(1 + k_1 r^2 + k_2 r^4) + 2p_1 x_d y_d + p_2(r^2 + 2x_d^2)$$

$$y_G = y_d(1 + k_1 r^2 + k_2 r^4) + 2p_2 x_d y_d + p_1(r^2 + 2y_d^2)$$

$$x_B = x_d(k_B + k_1 r^2 + k_2 r^4) + 2p_1 x_d y_d + p_2(r^2 + 2x_d^2)$$

$$y_B = y_d(k_B + k_1 r^2 + k_2 r^4) + 2p_2 x_d y_d + p_1(r^2 + 2y_d^2)$$

Moreover, $\{k_1, k_2\}$ is the coefficient indicating the imaging optics (110) distortion aberration with $k_1$ being the $3^{rd}$ aberration coefficient and $k_2$ the $5^{th}$ aberration coefficient.

Furthermore, in order to correct color image distortion due to imaging optics (110) aberration, a non-linear coordinates conversion of the deformed color image generation of the color mosaic image can be performed. As stated above, the conversion method of non-linear coordinates of color images with distortion aberration is known art, and it is possible to use such things as simulations to seek the above mentioned distortion aberration coefficients $\{k_1, k_2\}$. This distortion aberration coefficient $\{k_1, k_2\}$ is equivalent to this invention's image distortion coefficient.

In seeking the color mosaic image pixel coordinates $(u_{sR}, v_{sR}) (u_{sG}, v_{sG}) (u_{sB}, v_{sB})$ of these xy coordinates $(x_R, y_R) (x_G, y_G) (x_B, y_B)$ on the color mosaic image, the calculation procedure is the same as in the $2^{nd}$ embodiment for finding the color mosaic image pixel coordinates ($u_s$, $v_s$) from the xy coordinates (x, y) and is found using the formulas shown below.

$$u_{sR}=1000*x_R+799.5$$

$$u_{sR}=1000*y_R+599.5$$

$$u_{sG}=1000*x_G+799.5$$

$$v_{sG}=1000*y_G+599.5$$

$$u_{sB}=1000*x_B+799.5$$

$$v_{sB}=1000*y_B+599.5$$

Next with the sampling unit (143) set as above, the pixels within the color plane having the same color luminance value (sampling value) calculated by the coordinate conversion unit (142) is generated with interpolation. Also, the color generation unit (144), through the synthesis of the interpolation generated pixel positions of each color plane with the sampling unit (143), generates, a color image with multicolor luminance information containing pixels.

As explained in detail above, in the $3^{rd}$ embodiment, the color interpolation processing of the color image from the color mosaic image and the correction of the magnification chromatic aberration of the imaging optics (110) correction (image distortion processing) can be realized at the same time with just one interpolation calculation. Due to this, the magnification chromatic aberration is corrected and in addition to being able to lessen the burden of the processing when generating the deformed color image from the color mosaic image the deterioration of image quality caused by multiple interpolation processing can be suppressed.

Furthermore, in the above noted $3^{rd}$ embodiment, although we explained in detail with examples of the distortion processing for the correction of the distortion aberration of the imaging optics (110) it is not limited to just this. For example, as regards image distortion, it is also possible for color image rotation due to digital zoom magnification or reduction processing or hand blur correction processing. In these cases, it is possible for the enlargement, reduction or rotation to be expressed by affine transformation and the coefficient expressed by the affine transformation used as the image distortion coefficient.

($4^{th}$ Embodiment)

Figure 13:
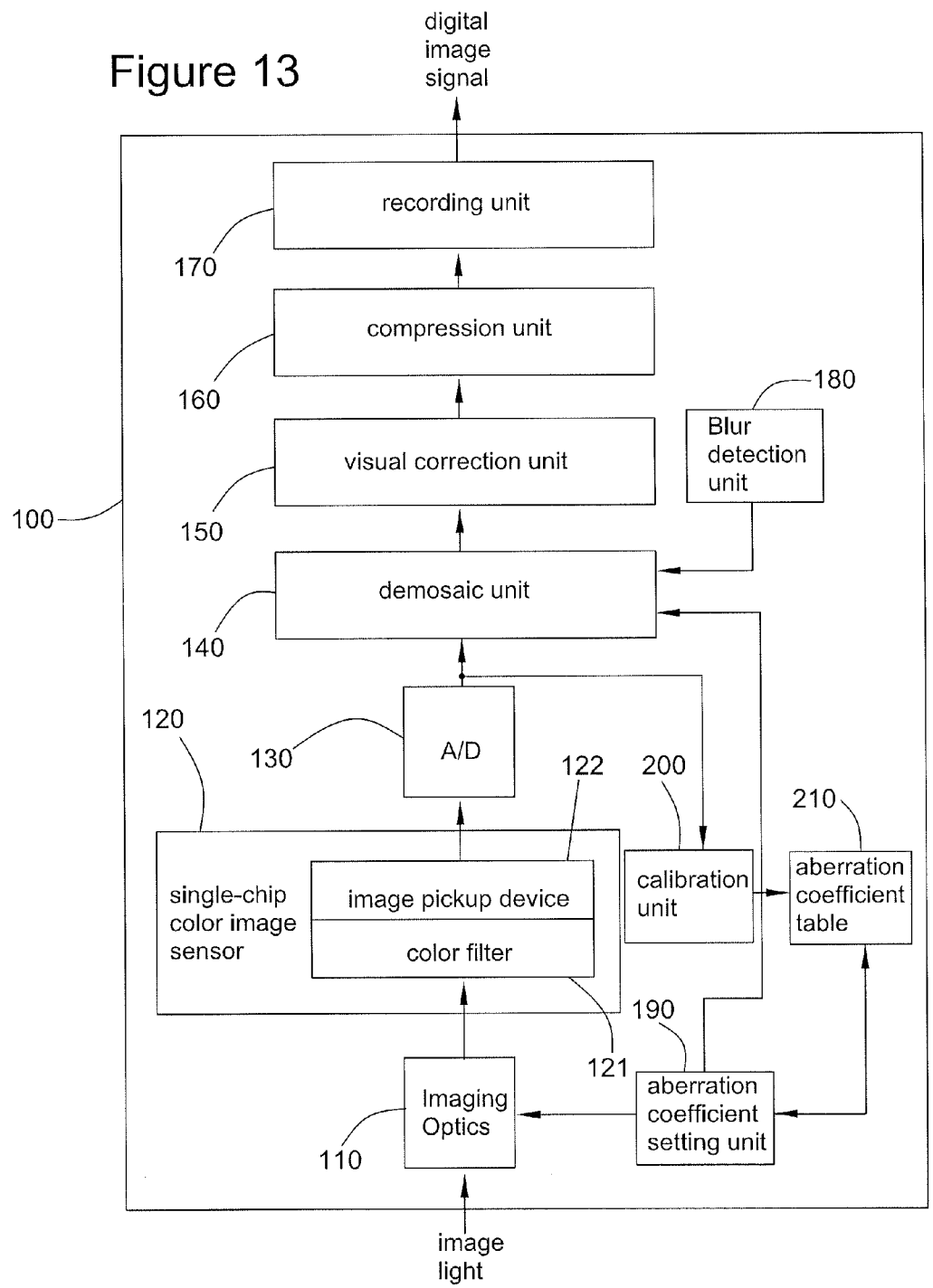
FIG. 13 is a diagram showing a schematic configuration of the color image apparatus of the $4^{th}$ embodiment of this invention's image processing apparatus.

Next, the $4^{th}$ embodiment of this present invention will be described in accordance with the accompanying drawings. FIG. 13 is a diagram illustrating a schematic configuration of a color image apparatus (100) according to the $4^{th}$ embodiment of the present invention. Moreover, as the items with the same code numbers as those in FIG. 8 have the exact same function we will not repeat the explanation for them here.

As indicated in FIG. 13, the $4^{th}$ embodiment's color image apparatus (100) is comprised from imaging optics (110), single-chip color image sensor (120), A/D conversion unit (130), demosaic unit (140), visual correction unit (150), compression unit (160), recording unit (170), blur detection unit (180), aberration coefficient setting unit (190), calibration unit (200) and aberration coefficient table and recording unit (210). Of these, the demosaic unit (140) and the aberration coefficient setting unit (190) correspond to the image processing apparatus of this invention.

In FIG. 13 the light of the photographed subject goes through the imaging optics (110) and forms an image on the imaging elements (122) of the single-chip color image sensor (120). At this time, the various types of distortion aberration of the imaging optics (110) cause a deterioration of the picked up image of the photographed object. For example, due to distortion aberration, straight lines of the subject become curved lines and, due to magnification chromatic aberration, the image formed on imaging elements (122) is subjected to image (color) shifting for each color constituent. Moreover, in the $4^{th}$ embodiment, for the imaging optics (110), it is possible to change the lens state of such things as the focal point distance (zoom) or the distance to the photographed subject (focus).

The blur detection unit (180) detects shaking of the color image apparatus (100) and has a blur correction coefficient {z, θ, dx, dy} that is set in the demosaic unit (140). There are methods such as gyro sensor use or measurement of feature-point matching variation when taking multiple photographs that are used for blur detection but this invention does not have any restriction as to the method used. Here, z is the blur size correction value for a photographed object in the color image apparatus (100) longitudinal direction, θ is the rotational correction value for roll axis blur of the object, dx is the correction value for blur in the right-left direction or yaw of the object and dy is the correction value for blur in the up-down direction or pitch of the object. Moreover, it is also permissible for z to include the digital zoom magnification ratio The aberration coefficient setting unit (190) corresponds to the coefficient setting part of the present invention. The aberration coefficient setting unit (190) detects the lens state and reads the aberration coefficient table recording unit (210) for the aberration coefficient $\{k_1, k_2, p_1, p_2, k_R, k_B\}$ appropriate to the lens state and then sets the coefficient for the demosaic unit (140). Here, $\{k_1, k_2, p_1, p_2\}$ are coefficients indicating the imaging optics (110) distortion aberration, $\{k_1, k_2\}$ indicates distortion in the radial ray direction and {p1, p2} indicate the linear direction distortion. $\{k_R, k_B\}$ are the coefficients indication the imaging optics (110) magnification chromatic aberration, $k_R$ is he R component magnification ratio for the G component and $k_B$ is the B component magnification ratio for the G component.

Moreover, in cases where there is a change in the lens state, the aberration coefficient setting unit (190) detects the change and reads the aberration coefficient table recording unit (210) for the aberration coefficient appropriate to the changed lens state and then sets the coefficient for the demosaic unit (140). The lens state detection can be performed, for example, by receiving the lens state setting information of the imaging optics (110) from the controller (no Figure illustrated) which controls color image apparatus (100).

By the way, it is not practical to record every possible aberration coefficient for the lens state to the table. Therefore, in this embodiment, only the aberration coefficients for a limited number of lens states are recorded to the aberration coefficient table recording unit (210). For example, for focal point distance and photographed subject distance, each has 3 patterns of lens states recorded for a total of 9 lens states and also their corresponding aberration coefficient values are recorded. To further explain, FIG. 14 shows part related to the aberration coefficient $k_1$ of this aberration coefficient table.

In FIG. 14, for example, if the lens state set in the imaging optics (110) is distance to photographed subject=2.0 m, focal point distance=3.5 mm, there is no suitable aberration coefficient value in the FIG. 14 aberration coefficient table. At that point, the aberration coefficient setting unit (190) reads in the aberration coefficient 0.08 for photographed subject distance=Mid: 1.0 m, focal point distance=Wide: 28 mm aberration coefficient 0.08; the aberration coefficient 0.05 for photographed subject distance=Far: lnf, focal point distance=Wide: 28 mm; the aberration coefficient 0.02 for photographed subject distance=Mid: 1.0 m, focal point distance=Mid: 50 mm; and the aberration coefficient 0.00 for photographed subject distance=Far: lnf, focal point distance=Mid: 50 mm from the aberration coefficient table and then does an interpolation on these 4 aberration coefficients.

Here, it is best to do an interpolation for the focal point distance and the distance to the photographed subject.

$k_1 = ((1/2.0-1/\text{lnf})(1/35-1/50)*0.08+(1/1.0-1/2.0)(1/35-1/50)*0.05+(1/2.0-1/\text{lnf})(1/28-1/35)*0.02+(1/1.0-1/2.0)(1/28-1/35)*0.00)/(1/1.0-1/\text{lnf})/(1/28-1/50) = 0.04$ As shown above, this kind of interpolative calculated value is set to the demosaic unit (140). The other distortion coefficients, $\{k_2, p_1, p_2, k_R, k_B\}$, are set to the demosaic unit (140) in the same manner after their interpolative values are calculated.

The calibration unit (200) generates the values for recording to the aberration coefficient table recording unit (210) in accordance with the digital image signal output form the A/D conversion unit (130). The calibration unit (200) seeks the aberration values of all coefficients $\{k_1, k_2, p_1, p_2, k_R, k_B\}$ for the plurality of lens states that are to be recorded to the table and records these to the aberration coefficient table recording unit (210).

Moreover, although the calibration unit (200) can be established as an internal part of the color image apparatus (100), when it is configured as a standalone unit separate from the color image apparatus (100) it must be equipped with a communications means so that the color image apparatus (100) can output the photographed image (the A/D conversion unit (130) digital image signal output) to the calibration unit or input the aberration coefficient received from the calibration unit.

While the demosaic unit (140) is performing correction in accordance with the blur correction coefficients $\{z, \theta, dx, dy\}$ as set by the blur detection unit (180) and the aberration coefficients $\{k_1, k_2, p_1, p_2, k_R, k_B\}$ as set the aberration coefficient unit (190) the conversion from the color mosaic image to the color image is performed.

Figure 15:
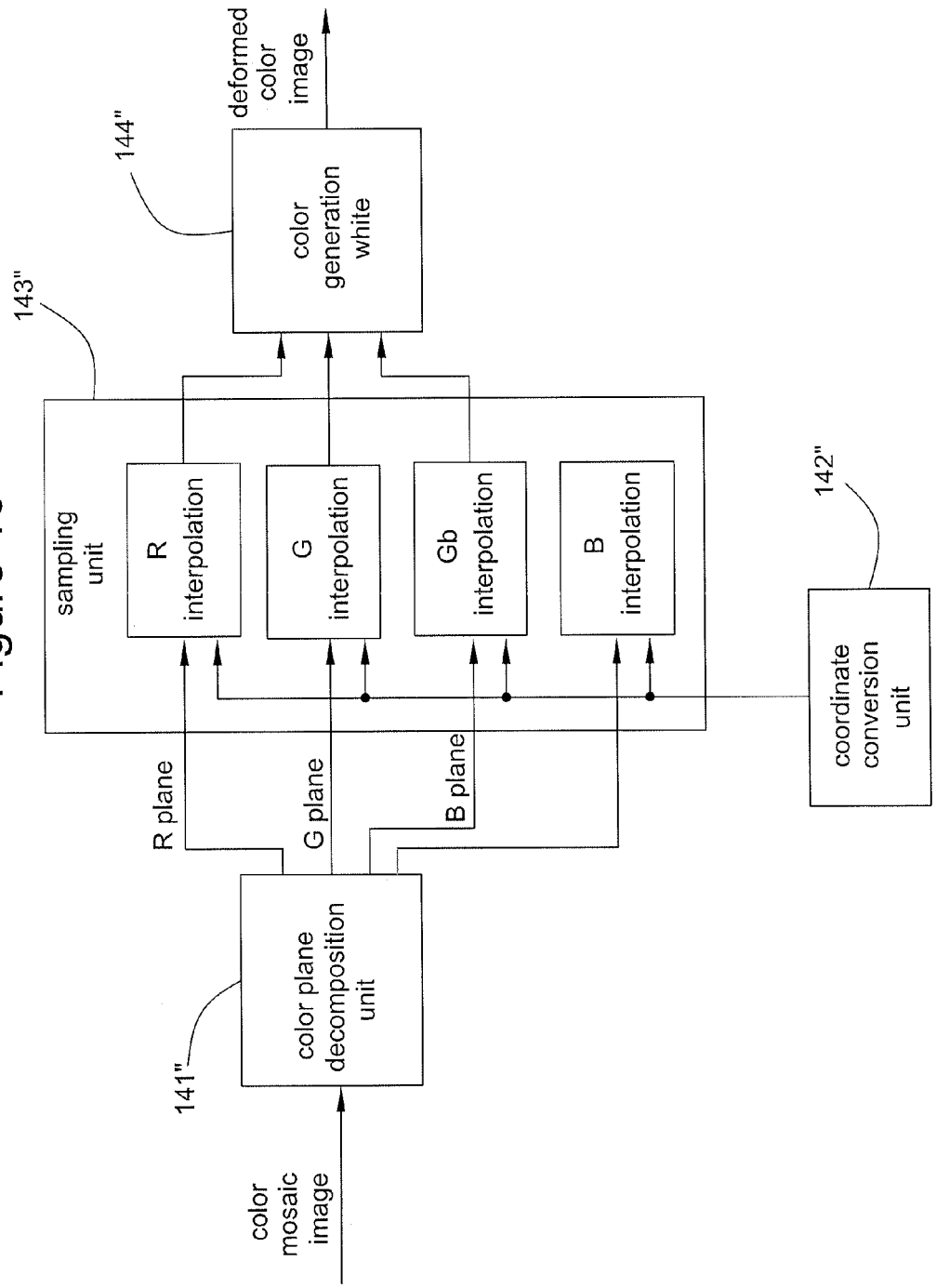
FIG. 15 is a block diagram showing a schematic configuration of the demosaic unit of the $4^{th}$ embodiment.

FIG. 15 is a block diagram showing a functional schematic configuration example of the demosaic unit (140). As is indicated in FIG. 15, the demosaic unit (140) functional configuration is comprised together with the color plane decomposition unit (141), coordinate conversion unit (142), sampling unit (143) and the color generation unit (144).

The color plane decomposition unit (141) takes the color mosaic image output from the A/D conversion unit (130) and separates it into multiple color planes having only the same value pixel color. For example, the color plane decomposition unit (141) as indicated in FIG. 12, separates it into 4 color planes, a R plane which has only R pixels, a Gr plane which has only Gr pixels, a Gb plane that has only Gb pixels and a B plane that has only B pixels.

The coordinates conversion unit (142) using the above mentioned blur correction coefficients $\{z, \theta, dx, dy\}$ and the aberration coefficients $\{k_1, k_2, p_1, p_2, k_R, k_B\}$, calculates the sampling coordinates on the color mosaic image for the corresponding color image pixel position when chromatic aberration correction, distortion aberration and had blur correction is performed using the color image pixel position generation of the color mosaic image. Below we will explain the sampling coordinates calculation procedure in detail.

First, as the xy coordinates system, the origin point is the center of the image and 1 is the maximum image height (maximum distance from the origin point), with the plus x coordinates in the right direction from the origin point of the screen and the plus y coordinates in the down direction from the origin point of the screen. Also, the output color image is 1600×1200 pixel square. In this case, the pixel coordinates $(u_d, v_d)$ for the uv coordinate system of the color image are, as indicated in FIG. 2, from the upper left of the screen going to right (0,0), (1,0), (2,0) ... with the next row being (1,0), (1,1), (2,1) ... then the xy coordinates $(x_d, y_d)$ corresponding to the pixel coordinates $(u_d, v_d)$ are as expressed by the relational expression shown in FIG. 23.

The coordinates conversion unit (142) first applies the above mention blur correction coefficients $\{z, \theta, dx, dy\}$ to these xy coordinates $(x_d, y_d)$ and applies the formula shown in FIG. 24 to obtain the post blur correction xy coordinates (x', y').

Furthermore, the coordinate conversion unit (142) applies the formulas shown below to the distortion aberration coefficients $\{k_1, k_2, p_1, p_2\}$ and see the xy coordinates $(x_G+y_G)$ in the Gr plane and the Gb plane.

$x_G = x'(1+k_1 r^2 + k_2 r^4) + 2p_1 x'y' + p_2(r'^2 + 2x'^2)$ $y_G = y'(1+k_1 r^2 + k_2 r^4) + 2p_2 x'y' + p_1(r'^2 + 2y_d^2)$ (However, $r'^2 = x'^2 y'^2$)

In addition, the coordinate conversion unit (142) by doing the coordinate conversion between planes considering the imaging optics (110) magnification chromatic aberration coefficients $\{k_B, k_B\}$ using the formula as shown in FIG. 25, finds each of the xy coordinates $(x_R, y_R)$ and $(x_B, y_B)$ for the R pane and the B plane. Here, with the G plane as the locator, $d_{Rx}, d_{Ry}$ are the coefficients that represent the B plane parallel misalignment.

On the other hand, with the color mosaic image as a 1600×1200 pixels square and the uv coordinate system pixel coordinates $(u_s, v_s)$ assigned in the same manner as noted above for the color image, the color mosaic pixel coordinates $(x_{sR}, y_{sR}), (x_{sG}, y_{sG}),$ and $(x_{sB}, y_{sB})$ corresponding to the xy coordinates $(x_R, y_R), (x_G, y_G),$ and $(x_B, y_B)$ of each color plane are as indicated by the formula in FIG. 26.

The above noted calculations results, as the pixel coordinates $(u_{sR}, v_{sR}), (u_{sG}, v_{sG})$ and $(u_{sB}, v_{sB})$ are not limited to an integer value, are generally non-integral. These color mosaic image pixel coordinates $(u_{sR}, v_{sR}), (u_{sG}, v_{sG})$ and $(u_{sB}, v_{sB})$ are sampling coordinates for each color plane.

The sampling unit (143), for each of the plurality of color planes separated by the color plane decomposition unit (141), generates an interpolation from the pixel value (sampling value) of the same color within the color plane for the sampling coordinates calculated by the coordinate conversion unit (142). The color generation unit (144), by synthesis of each of the color plane interpolative pixel value of the interpolation generation of the sampling unit (143), generates a color image having each of the multiple color luminance information for all the pixels. The processing content of this sampling unit (143) and the color generation unit (144) is the same as that of the $2^{nd}$ embodiment or $3^{rd}$ embodiment.

As explained in detail above, in the $4^{th}$ embodiment, the color interpolation processing of the color image from the color mosaic image, the correction of the magnification chromatic aberration of the imaging optics (110) correction (image distortion processing), aberration correction according to the lens state of the imaging optics (110) and image stabilization process correction of the color image apparatus (100) can be realized at the same time with just one interpolation calculation. Due to this, the magnification chromatic aberration is corrected and the processing burden is lightened when generating the deformed color image having distortion aberration correction and image stabilization process correction from the color mosaic image. In addition, the deterioration of image quality caused by multiple interpolation processing can be suppressed.

Furthermore, in the above noted 4$^{th}$ embodiment, although we explained in detail with examples using the blur correction coefficients {z, θ, dx, dy} and the aberration coefficients {$k_1$, $k_2$, $p_1$, $p_2$, $k_R$, $k_B$} when the coordination conversion unit (142) calculates the sampling coordinates, they do not all need to be used. In other words, only the aberration coefficient {$k_R$, $k_B$} is absolutely necessary with the remainder being able to be used in a combination.

Also, in the above noted 4$^{th}$ embodiment, although we explained in detail with examples about establishing the calibration unit (200) and making the aberration coefficient values variable, it is not limited to just this. For example, it is also possible not to establish a calibration unit (200) and fix the values of the aberration coefficient table.

(5$^{th}$ Embodiment)

Figure 16:
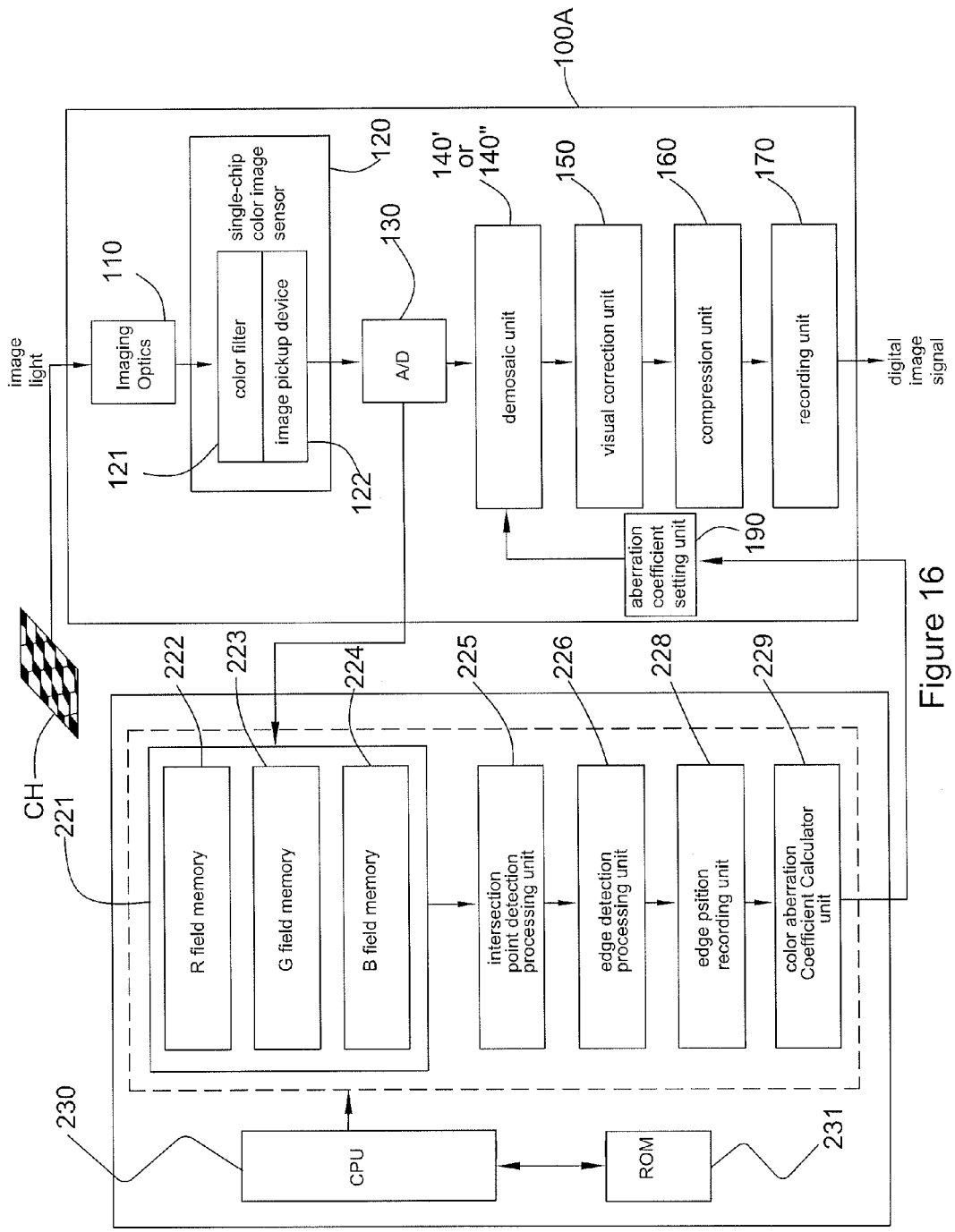
FIG. 16 is a schematic configuration of the color image apparatus of the $5^{th}$ embodiment.

Next, the 5$^{th}$ embodiment of this present invention will be described in accordance with the accompanying drawings. FIG. 16 is a diagram illustrating a schematic configuration of a color image apparatus (100A) according to the 5$^{th}$ embodiment of the present invention. Moreover, as the items in FIG. 16 with the same code numbers as those in FIG. 8 have the exact same function we will not repeat the explanation for them here.

The 5$^{th}$ embodiment is equipped with a chromatic aberration amount detection apparatus (200A) that detects the color aberration coefficient from the specified CH Chart photographed image and the chromatic aberration coefficients detected by the chromatic aberration amount detection apparatus (200A) are stored in the coordinates conversion unit (142) of the 3$^{rd}$ embodiment or the aberration coefficient setting unit (190) of 4$^{th}$ embodiment and, in the same manner as for the 2$^{nd}$-4$^{th}$ embodiments, in the demosaic unit (140), configured so as it calculates the sampling coordinates for each color plane of chromatic aberration corrected color image pixel position.

Moreover, this CH Chart is equivalent to the specified image of 23 and 24 in this inventions Scope of Claims.

Figure 17:
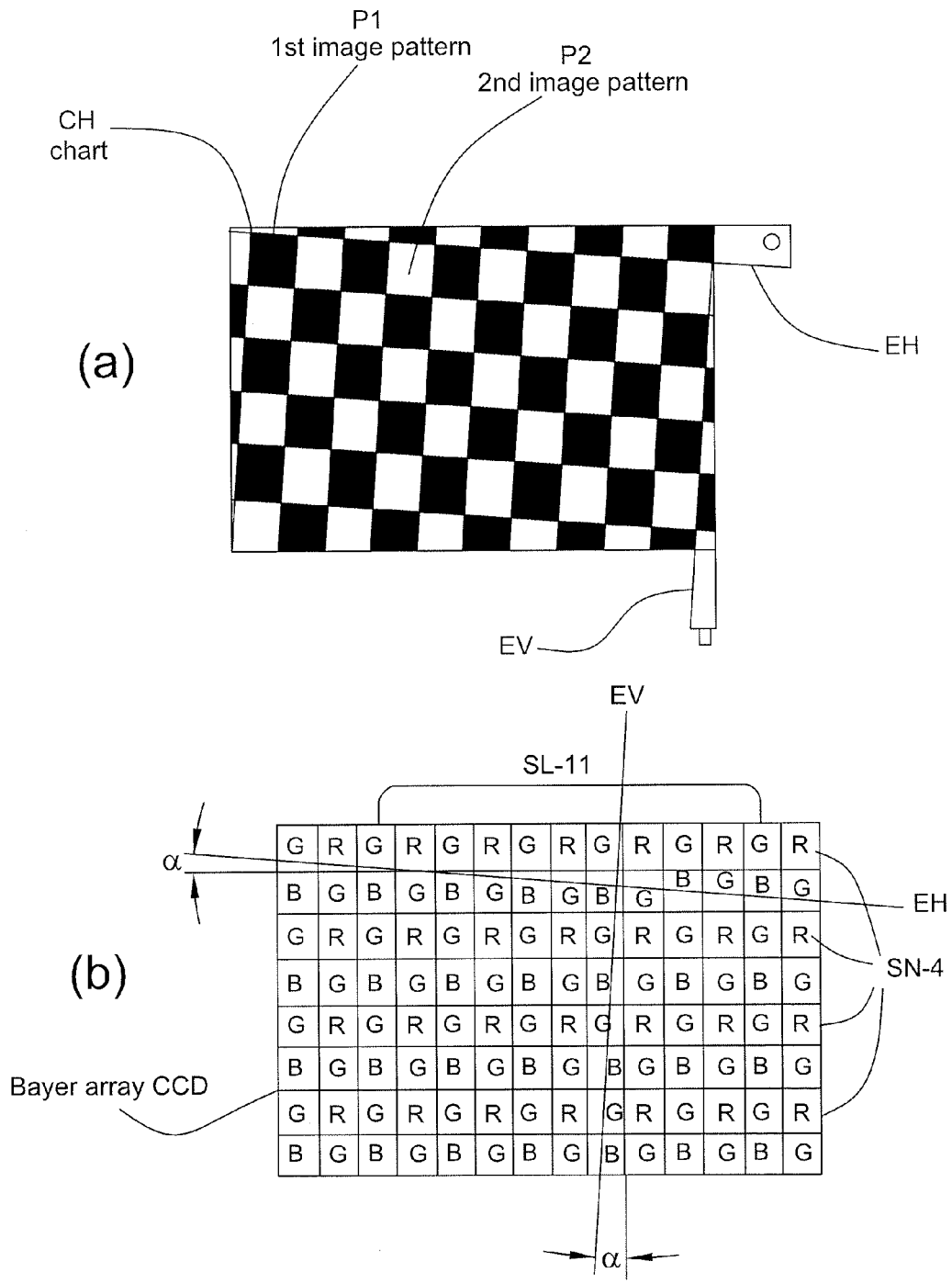
FIG. 17 is a diagram that explains the chromatic aberration amount detection of the $5^{th}$ embodiment, with FIG. 17 (a) showing it in chart form and FIG. 17 (b) showing a chart array for the imaging elements.

Below is an explanation of the configuration and operation of the chromatic aberration amount detection apparatus (200A) following the diagrams in FIG. 16-FIG. 19. FIG. 17 is an explanatory figure, of the same embodiment, of the chromatic aberration amount detection with FIG. 17 (a) being the expression in a chart format while FIG. 17 (b) is a figure showing the chart array for the imaging elements (122).

Figure 19:
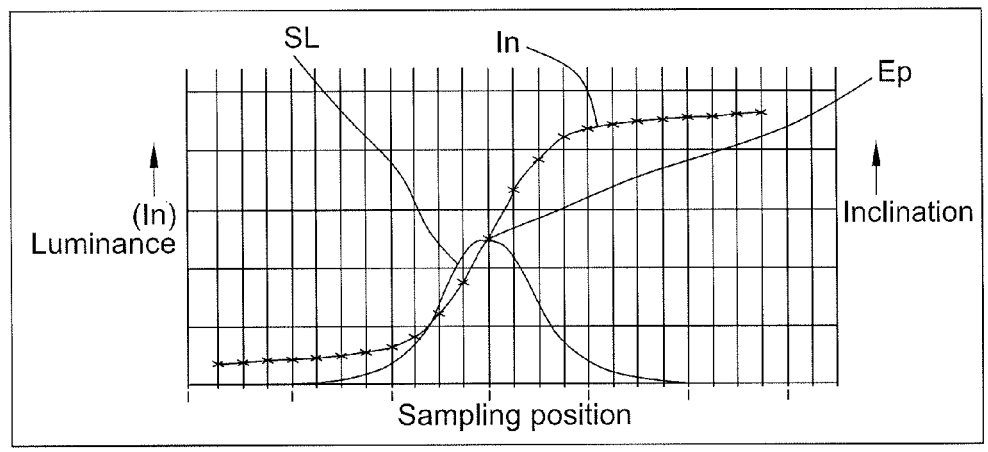
FIG. 19 is a diagram showing an explanation of edge detection in the $5^{th}$ embodiment.
Figure 20:
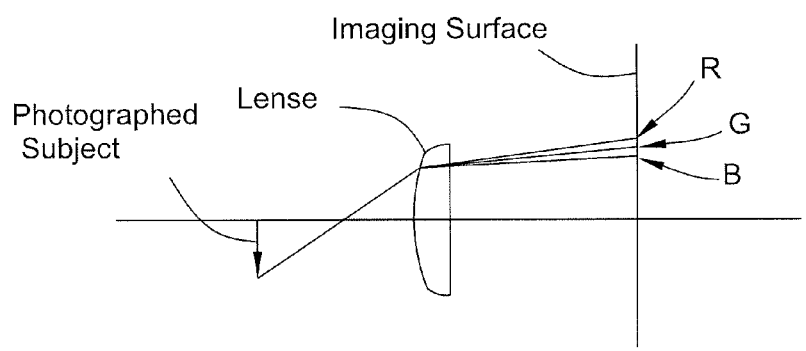
FIG. 20 is a diagram explaining the lens's magnification chromatic aberration.

Also, FIG. 18 is a diagrammatic explanation, in the same embodiment, of chromatic aberration amount detection with FIG. 18 (a) and (b) being a figure explaining when intersection is detected with FIG. 18 (c) being a figure explaining when there is edge detection for each intersection and FIG. 18 (d) is a figure explaining the sampling pixel array setting for the intersection with FIG. 19 being a figure that explains edge detection within the same embodiment.

First, as expressed in FIG. 16, the chromatic aberration amount detection apparatus (200A) of this embodiment, using the digital image signal obtained from the pickup image of the CH Chart, calculates the color aberration coefficient of the imaging optics (110).

The CH Chart, as expressed in FIG. 17 (a) and (b), shows, for the pixel array of the imaging elements (122) of the single-chip color image sensor (120), the 1$^{st}$ image pattern array P1 and the 2$^{nd}$ image pattern array P2 with just the inclination as that of the inclination angle α. Also, in this embodiment, the area of one image pattern that is read in by the imaging elements (122) is approximately equivalent to 100 pixels.

Next, the chromatic aberration amount detection apparatus (200A), as expressed in FIG. 16, takes the digital image signal (what is called the pixel signal that expresses the pixel luminance) input from the A/D conversion unit (130) and following the recorded pixel signal for each RGB color recorded to the field memory (221) and field memory (222), with the use of a program stored to ROM (231) by the CPU (230) controls all the processing executed by the aforementioned chromatic aberration detection apparatus (200A) with the following, the intersection point detection processing unit (225) that detects the image pattern 1$^{st}$ intersection point P1 and the image pattern 2$^{nd}$ intersection point P2, the RGB edge detection processing unit (226) that detects the RGB edge position of the 1$^{st}$ image pattern P1 and the 2$^{nd}$ image pattern P2 around the intersection detected by the intersection detection processing unit (225), the edge position recording unit (228) that records the edge position intersections as detected by the RGB edge detection processing unit (226), color aberration coefficient calculation unit (229) that uses color aberration coefficients from the edge positions recorded to the edge position recording unit (228), CPU (central processing unit) (230) and ROM (231).

The field memory (221) with the associated Bayer array, is configured from the R field memory (222) which records the red (R) pixel signal, the G field memory (223) which records the green (G) pixel signal and the B field memory (224) which records the blue (B) pixel signal.

The intersection detection processing unit (225) as expressed in FIG. 18 (a) and (b), calculates the luminance slope using the pixel value within the specified extent with the attention pixel at the center and detects the attention pixel position having the greatest luminance slope as the intersection point Int. Here, as expressed in FIG. 18 (b), with the attention pixel at the center 5 pixels are set vertically and horizontally and a weighted value is attached corresponding to pixel position and the intersection position is detected. In short, the up, down, left, right pixel values with the attention pixel at the center are multiplied by the FIG. 18 (b) coefficient and the results totaled. The absolute value of the totaled results is used as the attention pixel evaluation value and in cases where the evaluation value coefficient exceeds the specified threshold value that attention pixel posit is set as intersection Int as, as expressed by FIG. 18 (a), the multiple intersection point Int as detected as a matrix.

Also, in this embodiment, the 1$^{st}$ image pattern P1 and the 2$^{nd}$ image pattern P2 are arrayed so that the intersection point Int is expressed in equal interval matrix.

The RGB edge detection processing unit (226), as expressed in FIG. 18 (c), with a set sampling line length, scans the multiple up, down, left and right pixel rows Hs, Vs that go through the RGB intersection point Int and in addition to consecutively acquiring the pixel values, detects the sampling position that has the greatest pixel value change for the surrounding samplings locations as the edge.

In detail, as expressed by curved line In in FIG. 19, each pixel's luminance (pixel value) is sought at each sampling and, as expressed by the curved line SL, in accordance with the pixel values sought by the sampling, the pixel value change amount (slope SL) is calculated and the position EP where there is the greatest change amount (slope SL) is detected as the edge.

Also, when seeking the edge EP, as expressed in FIG. 18 (c), in the up, down pixel extent going through the intersection point Int, multiple row sampling (Hs) for each is executed and the edge of each row is detected and then the average of the upper part detected edge position and the lower part detected edge position is calculated and set as the left, right direction edge position within the intersection point Int.

Moreover, also for the left, right pixel extent that goes through intersection point Int, sampling (Vs) of each of the multiple rows is executed and the edge of each row detected and then the average of the left part detected edge position and the right part detected edge position is calculated and set as the up down direction edge position within the intersection point Int.

Also, sampling is done on each of the same color pixels, and when executing Hs sampling along the left-right direction, as expressed in FIG. 17 (b), the left-right sampling length SL (11) and the sampling number SN (4) which expresses the sampling up-down direction row number is set beforehand as required by the detection precision. Moreover, also when the up, down sampling Vs is executed the up, down direction sampling length and sampling number is set beforehand.

Also, as expressed in FIG. 18 (d), when the left, right direction edge position of the edge extending upwards through the intersection point Int is detected, if the sampling Hs1 position is too close to the intersection point Int, as the edge EH is inclined, an effect form the image patterns P1-2 to the left and right of the intersection point Int is felt and edge detection is difficult. Therefore, it is best that an appropriate interval S be established between the sampling line Hs1 and the intersection point Int.

The interval S, for example as expressed in FIG. 18 (d), can be sought geometrically. In other words, if the interval S from the intersection point Int is the edge blur amount E, inclination angle α, sampling line length are given the formula L=SL/2, S=(W+L)×tan α can be used to seek the interval S. In short, appropriately, the sampling Hs1 start position is never inside the P1-2 image pattern of FIG. 18 (d) and the interval S is sought separated from only the edge blur amount E from P1-2.

Next, the edge position recording unit (228) in the intersection point Int$_j$ (j is the serial number 1, 2, . . . assigned to each intersection point) records the G (green), R (red), B (blue) edge positions as, respectively, left, right direction (u direction) and up, down direction (v direction) for the corresponding (u$_{Gj}$, v$_{Gj}$), (u$_{Rj}$, v$_{Rj}$) and (u$_{Bj}$, v$_{Bj}$) in accordance to the RGB edge detection processing unit (226) detected edge position for each color.

Next the aberration coefficient calculation unit (229), using the edge positions (u$_{Gj}$, v$_{Gj}$), (u$_{Rj}$, v$_{Rj}$) and (u$_{Bj}$, v$_{Bj}$) recorded to the edge position recording unit (228), calculates the color aberration coefficients k$_R$, k$_R$.

In detail, first, in the same manner as that of the 2$^{nd}$ embodiment, as the xy coordinates system, the origin point is the center of the image and 1 is the maximum image height (maximum distance from the origin point), with the plus x coordinates in the right direction from the origin point of the screen and the plus y coordinates in the down direction from the origin point of the screen. Then, in the same manner as the 2$^{nd}$ embodiment, for the color image formed by the 640×480 pixel square, the pixel coordinates (u$_d$, v$_d$) for the uv coordinate system of the color image are, as indicated in FIG. 2, from the upper left of the screen going to right (0,0), (1,0), (2,0) . . . with the next row being (1,0), (1,1), (2,1) . . . and with the uv coordinate system pixel coordinates (319.5, 239.5) as the origin point for the xy coordinate system, the xy coordinates (x$_d$, y$_d$) corresponding to the pixel coordinates (u$_d$, v$_d$) are calculated for each color.

Here, in the arithmetic expression x$_d$=(u$_d$−319.5)/400, y$_d$=(v$_d$−239.5)/400 of the 2$^{nd}$ embodiment, in addition to replacing x$_d$ and y$_d$ with, x$_{Gj}$ and y$_{Gj}$, x$_{Rj}$ and y$_{Rj}$, x$_{Bj}$ and y$_{Bj}$, u$_d$ and v$_d$ are replaced with u$_{Gj}$ and v$_{Gj}$, u$_{Rj}$ and v$_{Rj}$, u$_{Bj}$ and v$_{Bj}$ and each RGB xy coordinates are calculated using the arithmetic expressions below.

$$x_{Gj}=(u_{Gj}-319.5)/400$$

$$y_{Gj}=(v_{Gj}-239.5)/400$$

$$x_{Rj}=(u_{Rj}-319.5)/400$$

$$y_{Rj}=(v_{Rj}-239.5)/400$$

$$x_{Bj}=(u_{Bj}-319.5)/400$$

$$y_{Bj}=(v_{Bj}-239.5)/400$$

Next the R color aberration coefficient k$_R$ is calculated using the k$_R$=Σ$_j$(x$_{Rj}^2$+y$_{Rj}^2$)/Σ$_j$ (x$_{Rj}$ x$_{Gj}$+y$_{Rj}$ y$_{Gj}$) arithmetic expression and the B color aberration coefficient k$_B$ is calculated using the kB=Σ$_j$(x$_{Bj}^2$+y$_{Bj}^2$)/Σ$_j$(x$_{Bj}$ x$_{Gj}$+y$_{Bj}$ y$_{Gj}$) arithmetic expression.

Next, the color aberration coefficients k$_R$ and k$_B$ calculated here are stored in the demosaic unit (140') (140") of the coordinate conversion unit (142') (142") and in the same manner as in the 2$^{nd}$-4$^{th}$ embodiments, the chromatic aberration correct sampling coordinates for the pickup image are calculated in the coordinate conversion unit (142') (142").

Also, as with the formula indicated in FIG. 27, the chromatic aberration rows can be sought by inserting the xy coordinates and aberration coefficient as calculated by the aberration coefficient calculation unit (229) into the formula indicated in FIG. 25. Moreover, in the FIG. 27 formula, the matrix at the farthest right side position indicates the pseudo inverse matrix.

As is seen in the above, the 5$^{th}$ embodiment's color image apparatus (100A) detects each color edge position with matrix intersection position mapping and, in accordance with the detected color edge position the color aberration coefficient (k$_R$, k$_B$) can be calculated and, using this detected color aberration coefficient, the color interpolation processing (demosaic process) that generates the color image from the color mosaic image and the imaging optics magnification chromatic aberration process can be realized with just one interpolation calculation.

In the above we have explained about an embodiment of this invention but this invention is not limited to an embodiment described above and can take many different embodiments.

For example, in the above 1$^{st}$-5$^{th}$ embodiments, the explanation of the color filter array (121) was based on the use of a primary color Bayer array but it is not limited to this. For example, a complimentary color filter array could also be used.

Also, in the 5$^{th}$ embodiment, the image apparatus (100A) is equipped with the chromatic aberration amount detection apparatus (200) but the chromatic aberration amount detection apparatus (200A) need not be configured as integral with the image apparatus (100A), it can be equipped as an external device. And it can be equipped with a part for pickup image output and color aberration coefficient input method, so that the input color aberration coefficient can be stored in the coordinate conversion unit (142'), (142") or aberration coefficient setting unit (190).

Also, the demosaic process method of the above 1$^{st}$-5$^{th}$ embodiments can also be realized through either of a hardware configuration, DSP (Digital Signal Processor), or a software method. For example, if software is used for the realization, the demosaic unit (140, 140', 140") for the above noted $1^{st}$-$5^{th}$ embodiments would be equipped with a computer CPU or MPU, RAM or ROM and it would operate from a program recorded to RAM or ROM.

In addition, all of the above $1^{st}$-$5^{th}$ embodiments of this invention are simply just substantive examples of the execution of this invention and cannot be interpreted to not limit the technical extent of this invention in anyways whatsoever. In other words, many different forms of this invention can be implemented that do not deviate from the spirit or major characteristics of the invention.

Industrial Applicability

The present invention is suitable for use in an image processing apparatus, image processing device that incorporates execution of a demosaic process that generates a color image with interpolation of all pixel multiple color luminance of the color mosaic image from the single-chip color imaging elements.

The invention claimed is:

1. An image processing apparatus that generates a color image containing multiple color luminance information of each pixel using a color mosaic image that contains single color luminance information of each pixel obtained from single-chip imaging elements as a plurality of photoelectrical converted pixels, the image processing apparatus comprising:
   a color plane separator unit that separates the color mosaic image into multiple color planes having the same color;
   a coordinates conversion unit that calculates sampling coordinates for the color mosaic image, wherein each sampling coordinate is calculated from a pixel position generated from the color mosaic image using a coefficient of an expression of an image processing of the color mosaic image, during execution of a color image process for the color image;
   a sampling unit that interpolative-generates color luminance values of same color pixels in the color planes as calculated by the coordinates conversion unit from pixel position values of the sampling coordinates; and
   a color image generation unit that synthesizes interpolated values of each of the color planes provided by the sampling unit.

2. The image processing apparatus according to claim 1 with the coordinate conversion unit, with coefficients expressing the image processing, and wherein the coordinate conversion unit calculates a corresponding sampling coordinate on the color mosaic image corresponding to a pixel position of the color image when a deformation process is performed, according to the pixel position of the color image.

3. The image processing apparatus according to claim 2 including, for the deformation process, at least one of the set of operations consisting of: magnification, reduction, rotation or skew correction processing.

4. The image processing apparatus according to claim 1, wherein the color mosaic image is obtained from a red (R), green (Gr, Gb) and blue (B) Bayer array color filter, with imaging elements corresponding to each pixel image position, wherein the color plane separator unit separates the two kinds of green pixels, Gr and Gb, having corners in contact respectively, into different color planes.

5. The image processing apparatus according to claim 4 wherein the color image generation unit takes the two kinds of green pixels, Gr and Gb, and adds the pixel values generated from the sampling unit, respectively, to generate the color image into two distinct color planes.

6. The image processing apparatus according to claim 4 including the two kinds of green pixels, Gr and Gb, separated on each color plane generated by the sampling unit, and wherein a pixel value difference is calculated, and wherein in accordance with the pixel value difference value the apparatus is further equipped with a pseudo-color determination unit to judge if a pseudo color is present.

7. The image processing apparatus according to claim 1 wherein the sampling unit performs interpolative-generation of the pixel values for surrounding pixels in the color plane for the pixel values at the sampling coordinates.

8. The image processing apparatus according to claim 1 wherein the coordinate conversion unit, with coefficients expressing the image processing, uses differing by color plane coefficients from the multiple color planes separated by the color plane separator unit, and wherein when executing chromatic aberration correction on the color image pixel position generated by the color mosaic image the coordinate conversion unit uses the color mosaic sampling coordinates corresponding to the color image pixel position, and wherein calculation of the differing sampling coordinates is done for each color plane.

9. The image processing apparatus according to claim 8 in which a further coefficient setting unit is equipped for setting the deformation aberration coefficient for the corresponding focal point length and distance to photographed subject set for the imaging optics.

10. The image processing apparatus according to claim 1 in which the coordinate conversion unit, with coefficients expressing the image processing, uses differing by color plane coefficients from the multiple color planes separated by the above color plane separator unit and when executing chromatic aberration correction and the image deformation of the color image pixel position generated by the color mosaic image uses the color mosaic sampling coordinates corresponding to the color image pixel position, and calculation of the differing sampling coordinates is performed for each color plane.

11. The image processing apparatus according to claim 1 in which the coordinate conversion unit, with coefficients expressing the image processing, uses differing by color plane coefficients from the multiple color planes separated by the color plane separator unit and when executing chromatic aberration correction and using the distortion aberration coefficient determined by the focal point distance and distance to photographed object as set for the imaging optics which introduces the image subject light, the image deformation of the color image pixel position generated by the color mosaic image uses the color mosaic sampling coordinates corresponding to the color image pixel position and calculation of the differing sampling coordinates is done for each color plane.

12. A color image processing method that generates a color image having multiple color information for each pixel from differing multiple photo electrically converted colored light pixels from single-chip imaging elements using a color mosaic image containing all single color luminance information of each pixel, the method comprising:
   a first step to separate the color mosaic image into multiple color planes having only the same color; and
   a second step to calculate sampling coordinates for the color mosaic image, wherein each sampling coordinate is calculated from a pixel position generated from the color mosaic image using a coefficient of an expression of an image processing of the color image, during execution of a color image process for the color image, and
   a sampling step, wherein for each of the multiple color planes, the sampling coordinates calculated in the second step are subjected, for the pixel values within the color plane of the same color, to an interpolation generation sampling; and a color image generation step that generates the color image through synthesis of color plane interpolative values of each of the color planes provided by the sampling second step.

13. The image processing method according to claim 12, in which in the second step, with coefficients expressing the image processing, using an image deformation coefficient for the color image generated by the color mosaic image, from the color image pixel position, when an image deformation is executed, the sampling coordinates on the color mosaic image corresponding to the color image pixel position is calculated.

14. The image processing method according to claim 12, in which in the second step, with coefficients expressing the image processing, using the-differing values of each of the color planes separated in the first step as coefficients for the color image generated by the color mosaic image, from the color image pixel position, when a chromatic aberration correction is executed, differing sampling coordinates on each color plane are calculated.

15. A non-transitory computer-readable medium including stored computer-executable instructions for performing a color image processing method that generates a color image having multiple color information for each pixel from differing multiple photo electrically converted colored light pixels from single-chip imaging elements using color mosaic image containing all of each pixels single color luminance information for each pixel, the method comprising:

a first step to separate the color mosaic image into multiple color planes having only the exact same color;

a second step to calculate sampling coordinates for the color mosaic image, wherein each sampling coordinate is calculated from a pixel position generated from the color mosaic image using a coefficient of an expression of an image processing of the color image, during execution of a color image process for the color image; and a sampling step, wherein for each of the multiple color planes, the sampling coordinates calculated in the second step are subjected, for the pixel values within the color plane of the same color, to an interpolation generation sampling;

a color image generation step that generates the color image through synthesis of color plane interpolative values of each of the color planes provided by the sampling step.

16. The non-transitory computer readable medium according to claim 15 wherein the second step, with coefficients expressing the image processing, using an image deformation coefficient for the color image generated by the color mosaic image, from the color image pixel position, when an image deformation is executed, the sampling coordinates on the color mosaic image corresponding to the color image pixel position is calculated.

17. The non-transitory computer readable medium according to claim 15 in which the second step, with coefficients expressing the image processing, using differing values of each of the color planes separated in the first step as coefficients for the color image generated by the color mosaic image, from the color image pixel position, when a chromatic aberration correction is executed, differing sampling coordinates on each color plane are calculated.

18. An image generation system comprising:

single-chip imaging elements having different multiple color photoelectrical converted pixels, an A/D conversion unit that converts a color mosaic image analog signal having undergone analog photoelectric conversion by the image elements into a digital signal, and an image processing apparatus that generates a color image containing multiple color luminance information of each pixel using a color mosaic image that contains single color luminance information of each pixel obtained from single-chip imaging elements as a plurality of photoelectrical converted pixels, the image processing apparatus comprising:

a color plane separator unit that separates the color mosaic image into multiple color planes having the same color;

a coordinates conversion unit that calculates sampling coordinates for the color mosaic image, wherein each sampling coordinate is calculated from a pixel position generated from the color mosaic image using a coefficient of an expression of an image processing of the color mosaic image, during execution of a color image process for the color image;

a sampling unit that interpolative-generates color luminance values of same color pixels in the color planes as calculated by the coordinates conversion unit from pixel position values of the sampling coordinates; and a color image generation unit that synthesizes interpolated values of each of the color planes provided by the sampling unit, and wherein the digital signal is output from the A/D conversion unit, using a color mosaic image that contains the single color luminance information of each pixel, and wherein the imaging processing apparatus generates a color image that contains the multiple color luminance information of each pixel.

* * * * *

UNITED STATES PATENT AND TRADEMARK OFFICE
CERTIFICATE OF CORRECTION

PATENT NO. : 8,494,260 B2
APPLICATION NO. : 12/666511
DATED : July 23, 2013
INVENTOR(S) : Sawada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 849 days.

Signed and Sealed this
Eighth Day of September, 2015

Michelle K. Lee
*Director of the United States Patent and Trademark Office*